(12) United States Patent
Gupta

(10) Patent No.: US 11,113,407 B2
(45) Date of Patent: Sep. 7, 2021

(54) SYSTEM AND METHODS FOR AUTOMATED DETECTION OF INPUT AND OUTPUT VALIDATION AND RESOURCE MANAGEMENT VULNERABILITY

(71) Applicant: Virsec Systems, Inc., San Jose, CA (US)

(72) Inventor: Satya Vrat Gupta, Dublin, CA (US)

(73) Assignee: VIRSEC SYSTEMS, INC., San Jose, CA (US)

( * ) Notice: Subject to any disclaimer, the term of this patent is extended or adjusted under 35 U.S.C. 154(b) by 6 days.

(21) Appl. No.: 16/513,498

(22) Filed: Jul. 16, 2019

(65) Prior Publication Data

US 2020/0042714 A1 Feb. 6, 2020

Related U.S. Application Data

(63) Continuation of application No. 15/318,429, filed as application No. PCT/US2015/037471 on Jun. 24, 2015, now Pat. No. 10,354,074.
(Continued)

(51) Int. Cl.
*G06F 11/00* (2006.01)
*G06F 12/14* (2006.01)
(Continued)

(52) U.S. Cl.
CPC .............. *G06F 21/577* (2013.01); *G06F 8/65* (2013.01); *G06F 11/3604* (2013.01);
(Continued)

(58) Field of Classification Search
USPC ...................................................... 726/4, 24
See application file for complete search history.

(56) References Cited

U.S. PATENT DOCUMENTS

| 4,080,650 A | 3/1978 | Beckett |
| 4,215,406 A | 7/1980 | Gomola et al. |
| | (Continued) | |

FOREIGN PATENT DOCUMENTS

| CN | 101154258 A | 4/2008 |
| CN | 102012987 A | 4/2011 |
| | (Continued) | |

OTHER PUBLICATIONS

"Multi-tier Application Database Debugging," Jun. 2011. Visual Studio 2005. Retrieved from Internet: Dec. 5, 2016. http://msdn.microsoft.com/en-us/library/ms165059(v=vs.80).aspx.
(Continued)

*Primary Examiner* — Jeffrey C Pwu
*Assistant Examiner* — Samuel Ambaye
(74) *Attorney, Agent, or Firm* — Hamilton, Brook, Smith & Reynolds, P.C.

(57) ABSTRACT

In an example embodiment, a system analyzes a set of computer routines. The system may perform an analysis including a determination of a likelihood of vulnerability to unexpected behavior for one or more computer routines of the set. Based upon the analysis, the system may identify one or more computer routines of the set having the likelihood of vulnerability. The system may asynchronously and dynamically manipulate at least one of the one or more computer routines through a testing technique. The system may determine unexpected behavior of at least one of the one or more computer routines.

18 Claims, 14 Drawing Sheets

Related U.S. Application Data

(60) Provisional application No. 61/998,318, filed on Jun. 24, 2014.

(51) Int. Cl.
*G06F 12/16* (2006.01)
*G08B 23/00* (2006.01)
*G06F 21/57* (2013.01)
*G06F 11/36* (2006.01)
*G06F 8/65* (2018.01)

(52) U.S. Cl.
CPC ...... *G06F 11/3672* (2013.01); *G06F 11/3684* (2013.01); *G06F 2221/033* (2013.01)

(56) References Cited

U.S. PATENT DOCUMENTS

| | | | |
|---|---|---|---|
| 4,466,077 A | 8/1984 | Iannucci et al. | |
| 4,672,534 A | 6/1987 | Kamiya | |
| 4,751,667 A | 6/1988 | Ross | |
| 4,803,720 A | 2/1989 | Newell et al. | |
| 5,161,193 A | 11/1992 | Lampson et al. | |
| 5,222,220 A | 6/1993 | Mehta | |
| 5,224,160 A | 6/1993 | Paulini et al. | |
| 5,235,551 A | 8/1993 | Sinofsky et al. | |
| 5,297,274 A | 3/1994 | Jackson | |
| 5,321,828 A | 6/1994 | Phillips et al. | |
| 5,359,659 A | 10/1994 | Rosenthal | |
| 5,390,309 A | 2/1995 | Onodera | |
| 5,440,723 A | 8/1995 | Arnold et al. | |
| 5,611,043 A | 3/1997 | Even et al. | |
| 5,684,948 A | 11/1997 | Johnson et al. | |
| 5,784,552 A | 7/1998 | Bishop et al. | |
| 5,826,012 A | 10/1998 | Lettvin | |
| 5,829,039 A | 10/1998 | Sugino et al. | |
| 5,850,559 A | 12/1998 | Angelo et al. | |
| 5,873,124 A | 2/1999 | Draves | |
| 5,890,005 A | 3/1999 | Lindholm | |
| 5,909,580 A | 6/1999 | Crelier et al. | |
| 5,933,594 A | 8/1999 | La Joie et al. | |
| 5,978,584 A | 11/1999 | Nishibata et al. | |
| 5,983,348 A | 11/1999 | Ji | |
| 6,077,312 A | 6/2000 | Bates et al. | |
| 6,119,206 A | 9/2000 | Tatkar et al. | |
| 6,134,652 A | 10/2000 | Warren | |
| 6,151,618 A | 11/2000 | Wahbe et al. | |
| 6,178,522 B1 | 1/2001 | Zhou et al. | |
| 6,237,137 B1 | 5/2001 | Beelitz | |
| 6,240,501 B1 | 5/2001 | Hagersten | |
| 6,263,489 B1 | 7/2001 | Olsen et al. | |
| 6,275,893 B1 | 8/2001 | Bonola | |
| 6,516,408 B1 | 2/2003 | Abiko et al. | |
| 6,553,429 B1 | 4/2003 | Wentz et al. | |
| 6,665,316 B1 | 12/2003 | Eidson | |
| 6,775,780 B1 | 8/2004 | Muttik | |
| 6,782,478 B1 | 8/2004 | Probert | |
| 6,832,302 B1 | 12/2004 | Fetzer et al. | |
| 6,895,508 B1 | 5/2005 | Swanberg et al. | |
| 6,948,091 B2 | 9/2005 | Bartels et al. | |
| 6,973,577 B1 | 12/2005 | Kouznetsov | |
| 6,981,176 B2 | 12/2005 | Fruehling et al. | |
| 7,181,585 B2 | 2/2007 | Abrashkevich et al. | |
| 7,257,763 B1 | 8/2007 | Srinivasan et al. | |
| 7,260,845 B2 | 8/2007 | Kedma et al. | |
| 7,272,748 B1 | 9/2007 | Conover et al. | |
| 7,281,225 B2 | 10/2007 | Jain et al. | |
| 7,284,276 B2 | 10/2007 | Conover et al. | |
| 7,328,323 B1 | 2/2008 | Conover | |
| 7,380,245 B1 | 5/2008 | Lovette | |
| 7,383,166 B2 | 6/2008 | Ashar et al. | |
| 7,386,839 B1 | 6/2008 | Golender et al. | |
| 7,453,910 B1 | 11/2008 | Biberstein et al. | |
| 7,480,919 B2 | 1/2009 | Bray et al. | |
| 7,484,239 B1 | 1/2009 | Tester et al. | |
| 7,490,268 B2 | 2/2009 | Keromytis et al. | |
| 7,526,654 B2 | 4/2009 | Charbonneau | |
| 7,526,755 B2 | 4/2009 | DeLine et al. | |
| 7,539,875 B1 | 5/2009 | Manferdelli et al. | |
| 7,555,747 B1 | 6/2009 | Agesen | |
| 7,603,704 B2 | 10/2009 | Bruening et al. | |
| 7,603,715 B2 | 10/2009 | Costa et al. | |
| 7,613,954 B2 | 11/2009 | Grey et al. | |
| 7,634,812 B2 | 12/2009 | Costa et al. | |
| 7,644,440 B2 | 1/2010 | Sinha et al. | |
| 7,730,305 B2 | 6/2010 | Eun et al. | |
| 7,747,725 B2 | 6/2010 | Williams et al. | |
| 7,853,803 B2 | 12/2010 | Milliken | |
| 7,895,651 B2 | 2/2011 | Brennan | |
| 7,971,044 B2 | 6/2011 | Dieffenderfer et al. | |
| 7,971,255 B1 | 6/2011 | Kc et al. | |
| 8,042,180 B2 | 10/2011 | Gassoway | |
| 8,151,117 B2 | 4/2012 | Hicks | |
| 8,261,326 B2 | 9/2012 | Ben-Natan | |
| 8,307,191 B1 | 11/2012 | Jain | |
| 8,336,102 B2 | 12/2012 | Neystadt et al. | |
| 8,353,040 B2 | 1/2013 | Tahan et al. | |
| 8,407,523 B2 | 3/2013 | Stewart et al. | |
| 8,510,596 B1 | 8/2013 | Gupta et al. | |
| 8,954,738 B2 | 2/2015 | Asokan et al. | |
| 8,958,546 B2 | 2/2015 | Probert | |
| 8,966,312 B1 | 2/2015 | Gupta et al. | |
| 9,230,455 B2 | 1/2016 | Probert | |
| 9,418,227 B2 | 8/2016 | Franklin | |
| 9,516,053 B1 | 12/2016 | Muddu et al. | |
| 10,079,841 B2 | 9/2018 | Gupta et al. | |
| 10,114,726 B2 | 10/2018 | Gupta | |
| 10,331,888 B1 | 6/2019 | Gupta et al. | |
| 10,354,074 B2 | 7/2019 | Gupta | |
| 2001/0013094 A1 | 8/2001 | Etoh et al. | |
| 2001/0023479 A1 | 9/2001 | Kimura et al. | |
| 2001/0033657 A1 | 10/2001 | Lipton et al. | |
| 2001/0047510 A1 | 11/2001 | Angel et al. | |
| 2002/0129226 A1 | 9/2002 | Eisen et al. | |
| 2002/0138554 A1 | 9/2002 | Feigen et al. | |
| 2002/0169999 A1 | 11/2002 | Bhansali et al. | |
| 2003/0014667 A1 | 1/2003 | Kolichtchak | |
| 2003/0023865 A1 | 1/2003 | Cowie et al. | |
| 2003/0028755 A1 | 2/2003 | Ohsawa et al. | |
| 2003/0033498 A1 | 2/2003 | Borman et al. | |
| 2003/0041290 A1 | 2/2003 | Peleska | |
| 2003/0079158 A1 | 4/2003 | Tower et al. | |
| 2003/0120884 A1 | 6/2003 | Koob et al. | |
| 2003/0120885 A1 | 6/2003 | Bonola | |
| 2003/0145253 A1 | 7/2003 | de Bonet | |
| 2003/0188160 A1 | 10/2003 | Sunder et al. | |
| 2003/0188174 A1 | 10/2003 | Zisowski | |
| 2003/0191940 A1 | 10/2003 | Sinha et al. | |
| 2003/0021725 A1 | 11/2003 | Wyatt | |
| 2003/0212913 A1 | 11/2003 | Vella | |
| 2003/0217277 A1 | 11/2003 | Narayanan | |
| 2004/0049660 A1 | 3/2004 | Jeppesen et al. | |
| 2004/0103252 A1 | 5/2004 | Lee et al. | |
| 2004/0117682 A1 | 6/2004 | Xu | |
| 2004/0120173 A1 | 6/2004 | Regev et al. | |
| 2004/0133777 A1 | 7/2004 | Kiriansky et al. | |
| 2004/0157639 A1 | 8/2004 | Morris et al. | |
| 2004/0162861 A1 | 8/2004 | Detlefs | |
| 2004/0168078 A1 | 8/2004 | Brodley et al. | |
| 2004/0215755 A1 | 10/2004 | O'Neill | |
| 2004/0221120 A1 | 11/2004 | Abrashkevich et al. | |
| 2004/0268095 A1 | 12/2004 | Shpeisman et al. | |
| 2004/0268319 A1 | 12/2004 | Tousignant | |
| 2005/0010804 A1 | 1/2005 | Bruening et al. | |
| 2005/0022153 A1 | 1/2005 | Hwang | |
| 2005/0028048 A1 | 2/2005 | New et al. | |
| 2005/0033980 A1 | 2/2005 | Willman et al. | |
| 2005/0039178 A1 | 2/2005 | Marolia et al. | |
| 2005/0055399 A1 | 3/2005 | Savchuk | |
| 2005/0071633 A1 | 3/2005 | Rothstein | |
| 2005/0086502 A1 | 4/2005 | Rayes et al. | |
| 2005/0108562 A1 | 5/2005 | Khazan et al. | |
| 2005/0132179 A1 | 6/2005 | Glaum et al. | |
| 2005/0138409 A1 | 6/2005 | Sheriff et al. | |

(56) References Cited

U.S. PATENT DOCUMENTS

| | | |
|---|---|---|
| 2005/0144471 A1 | 6/2005 | Shupak et al. |
| 2005/0144532 A1 | 6/2005 | Dombrowa et al. |
| 2005/0172115 A1 | 8/2005 | Bodorin et al. |
| 2005/0195748 A1 | 9/2005 | Sanchez |
| 2005/0210275 A1 | 9/2005 | Homing et al. |
| 2005/0223238 A1 | 10/2005 | Schmid et al. |
| 2005/0246522 A1 | 11/2005 | Samuelsson et al. |
| 2005/0273854 A1 | 12/2005 | Chess et al. |
| 2005/0283601 A1 | 12/2005 | Tahan |
| 2005/0283835 A1 | 12/2005 | Lalonde et al. |
| 2005/0289527 A1 | 12/2005 | Illowsky et al. |
| 2006/0002093 A1 | 1/2006 | Wyatt |
| 2006/0002103 A1 | 1/2006 | Conti et al. |
| 2006/0002385 A1 | 1/2006 | Johnsen et al. |
| 2006/0026311 A1 | 2/2006 | Nicolai et al. |
| 2006/0075274 A1 | 4/2006 | Zimmer et al. |
| 2006/0095895 A1 | 5/2006 | K. |
| 2006/0126799 A1 | 6/2006 | Burk |
| 2006/0143707 A1 | 6/2006 | Song et al. |
| 2006/0155905 A1 | 7/2006 | Leino et al. |
| 2006/0161583 A1 | 7/2006 | Burka et al. |
| 2006/0195745 A1 | 8/2006 | Keromytis et al. |
| 2006/0212837 A1 | 9/2006 | Prasad |
| 2006/0242703 A1 | 10/2006 | Abeni |
| 2006/0026543 A1 | 11/2006 | Shankar et al. |
| 2006/0245588 A1 | 11/2006 | Hatakeyama |
| 2006/0248519 A1 | 11/2006 | Jaeger et al. |
| 2006/0271725 A1 | 11/2006 | Wong |
| 2006/0282891 A1 | 12/2006 | Pasko |
| 2007/0011686 A1 | 1/2007 | Ben-Zvi |
| 2007/0016953 A1 | 1/2007 | Morris et al. |
| 2007/0027815 A1 | 2/2007 | Sobel et al. |
| 2007/0050848 A1 | 3/2007 | Khalid |
| 2007/0067359 A1 | 3/2007 | Barrs et al. |
| 2007/0118646 A1 | 5/2007 | Gassoway |
| 2007/0136455 A1 | 6/2007 | Lee et al. |
| 2007/0157003 A1 | 7/2007 | Durham et al. |
| 2007/0169075 A1 | 7/2007 | Lill et al. |
| 2007/0174549 A1 | 7/2007 | Gyl et al. |
| 2007/0174703 A1 | 7/2007 | Gritter et al. |
| 2007/0192854 A1 | 8/2007 | Kelley et al. |
| 2007/0274311 A1 | 11/2007 | Yang |
| 2008/0016339 A1 | 1/2008 | Shukla |
| 2008/0215925 A1 | 9/2008 | Degenaro et al. |
| 2008/0250496 A1 | 10/2008 | Namihira |
| 2008/0263505 A1* | 10/2008 | StClair ............... G06F 11/3692 717/101 |
| 2008/0301647 A1 | 12/2008 | Neystadt et al. |
| 2009/0144698 A1* | 6/2009 | Fanning ............. G06F 11/3676 717/120 |
| 2009/0144898 A1* | 6/2009 | Wu ...................... A61G 7/0507 5/425 |
| 2009/0158075 A1 | 6/2009 | Biberstein et al. |
| 2009/0217377 A1 | 8/2009 | Arbaugh et al. |
| 2009/0290226 A1 | 11/2009 | Asakura et al. |
| 2010/0005531 A1 | 1/2010 | Largman et al. |
| 2010/0064111 A1 | 3/2010 | Kunimatsu et al. |
| 2010/0153785 A1* | 6/2010 | Keromytis ............. G06F 11/08 714/38.11 |
| 2010/0028753 A1 | 11/2010 | Kim et al. |
| 2012/0166878 A1 | 6/2012 | Sinha et al. |
| 2012/0192053 A1 | 7/2012 | Waltenberger |
| 2012/0239857 A1 | 9/2012 | Jibbe et al. |
| 2012/0284697 A1 | 11/2012 | Choppakatla et al. |
| 2013/0086020 A1* | 4/2013 | Addala ................ G06F 16/958 707/705 |
| 2013/0086550 A1 | 4/2013 | Epstein |
| 2013/0111547 A1 | 5/2013 | Kraemer |
| 2013/0239215 A1 | 9/2013 | Kaufman |
| 2013/0250965 A1 | 9/2013 | Yakan |
| 2013/0333040 A1 | 12/2013 | Diehl et al. |
| 2014/0047282 A1 | 2/2014 | Deb et al. |
| 2014/0108803 A1 | 4/2014 | Probert |
| 2014/0237599 A1 | 8/2014 | Gertner et al. |
| 2014/0304815 A1 | 10/2014 | Maeda |
| 2014/0337639 A1 | 11/2014 | Probert |
| 2015/0039717 A1 | 2/2015 | Chiu et al. |
| 2015/0163242 A1 | 6/2015 | Laidlaw et al. |
| 2016/0094349 A1 | 3/2016 | Probert |
| 2016/0212159 A1 | 7/2016 | Gupta et al. |
| 2017/0063886 A1 | 3/2017 | Muddu et al. |
| 2017/0063888 A1 | 3/2017 | Muddu et al. |
| 2017/0123957 A1 | 5/2017 | Gupta |
| 2017/0132419 A1 | 5/2017 | Gupta |
| 2018/0324195 A1 | 11/2018 | Gupta et al. |
| 2019/0138725 A1 | 5/2019 | Gupta |

FOREIGN PATENT DOCUMENTS

| | | |
|---|---|---|
| EP | 1 085 418 | 3/2001 |
| EP | 1 703 395 | 9/2006 |
| EP | 1758021 A2 | 2/2007 |
| JP | 2003330736 | 11/2003 |
| JP | 2004287810 | 10/2004 |
| JP | 2005258498 | 9/2005 |
| JP | 2005276185 | 10/2005 |
| JP | 2006053760 | 2/2006 |
| JP | 2008-129714 A | 6/2008 |
| JP | 2009031859 | 2/2009 |
| JP | 2010257150 | 11/2010 |
| JP | 2011059930 | 3/2011 |
| JP | 2011198022 | 10/2011 |
| JP | 2014531647 | 11/2014 |
| WO | WO 2010/067703 | 6/2010 |
| WO | 2014021190 A1 | 2/2014 |
| WO | WO 2015/03 8944 | 3/2015 |
| WO | 2015200046 A1 | 12/2015 |
| WO | WO 2015/200508 | 12/2015 |
| WO | WO 2015/200511 | 12/2015 |
| WO | WO 2017/218872 | 12/2017 |

OTHER PUBLICATIONS

"Software Instrumentation," edited by Wah, B., Wiley Encyclopedia of Computer Science and Engineer, Wiley, pp. 1-11, XP007912827, Jan. 1, 2008.

"Troubleshooting n-tier." Apr. 2011. Retrieved from Internet: http://drc.ideablade.com/xwiki/bin/view/Documentation/deploy-troubleshooting-ntier.

Aarniala, J., "Instrumenting Java bytecode," Seminar work for the Compilers-course, Department of Computer Science University of Helsinki, Finland (Spring 2005).

Ashcraft, K. and Engler, D., "Using Programmer-Written Compiler Extensions to Catch Security Holes," Slides presented at the Proceedings of the IEEE Symposium on Security and Privacy, Berkeley, CA, pp. 1-14, (May 2002).

Austin, T., et al., "Efficient Detection of All Pointer and Array Access Errors," Proceedings of the ACM SIGPLAN 94 Conference on Programming Language Design and Implementation, Orlando, FL, 12 pages (Jun. 1994).

Baratloo, A., et al., "Transparent Run-Time Defense Against Stack Smashing Attacks," Proceedings of the USENIX 2000 Annual Technical Conference, San Diego, CA, 12 pages (Jun. 2000).

Barrantes, E., et al., "Randomized Instruction Set Emulation to Disrupt Binary Code Injection Attacks," Proceedings of the 10th Annual ACM Conference on Computer and Communications Security, Washington, DC, 10 pages (Oct. 2003).

Berger, E. and Zorn, B., "Diehard: Probabilistic Memory Safety for Unsafe Languages," Proceedings of the Programming Language Design and Implementation (PLDI), 11 pages (Jun. 2006).

Bernat, A.R et al., "Anywhere, Any-Time Binary Instrumentation," Proceedings of the 10th ACM SIGPLAN-SIGSOFT workshop on Program analysis for software tools (PASTE), ACM, Szeged, Hungary (Sep. 2011).

Bhatkar, S., et al., Address Obfuscation: An Efficient Approach to Combat a Broad Range of Memory Error Exploits, Proceedings of the 12th USENIX Security Symposium, Washington, DC, 16 pages (Aug. 2003).

(56) References Cited

OTHER PUBLICATIONS

Buck, B., et al., "An API For Runtime Code Patching," Jan. 1, 2000, vol. 14, No. 4, pp. 317-329, XP008079534, p. 317, Jan. 1, 2000.
Bush, W., et al., "A Static Analyzer for Finding Dynamic Programming Errors," Software: Practice and Experience, 30(7): 775-802 (2000).
Chew, M. and Song, D., "Mitigating Buffer Overflows by Operating System Randomization," (Report No. CMU-CS-02-197), Carnegie Mellon University, 11 pages (Dec. 2002).
Chiueh, T. and Hsu, F., "RAD: A Compile-Time Solution to Buffer Overflow Attacks," Proceedings of the 21st International Conference on Distributed Computing Systems, Pheonix, AZ, 20 pages (Apr. 2001).
Cowan, C., et al., "FormatGuard: Automatic Protection from Printf Format String Vulnerabilities," Proceedings of the 10th USENIX Security Symposium, Washington, DC, 9 pages (Aug. 2001).
Cowan, C., et al., "PointGuardTM: Protecting Pointers From Buffer Overflow Vulnerabilities," Proceedings of the 12th USENIX Security Symposium, Washington, DC, 15 pages (Aug. 2003).
Cowan, C., et al., "Protecting Systems from Stack Smashing Attacks with StackGuard," Linux Expo, Raleigh, NC, 11 pages (May 1999).
Cowan, C., et al., "Stackguard: Automatic Adaptive Detection and Prevention of Buffer-Overflow Attacks," Proceedings of the 7th USENIX Security Conference, San Antonio, TX, 16 pages (Jan. 1998).
Dhurjati, D., et al., "Memory Safety Without Runtime Checks or Garbage Collection," Proceedings of the 2003 ACM SIGPLAN Conference on Language, Compiler, and Tool Support for Embedded Systems, San Diego, CA, 12 pages (Jun. 2003).
Dor, S., et al., "Cleanness Checking of String Manipulation in C Programs via Integer Analysis," Proceedings of the $8^{th}$ International Static Analysis Symposium, Paris, France, Springer LNCS 2126:194-212 (2002).
Engler, D., et al., "Checking System Rules Using System-Specific, Programmer-Written Compiler Extensions," Stanford University, 16 pages (Oct. 2000).
Erlingsson, U. and Schneider, F., "SASI Enforcement of Security Policies: A Retrospective," Proceedings of the New Security Paradigm Workshop, Caledon Hills, Ontario, Canada, (Sep. 1999).
Etoh, H and Yoda, K., "Protecting from Stack-Smashing Attacks," IBM Research Division, Tokyo Research Laboratory, Jun. 2000, www.trl.ibm.com, 23 pages, retrieved from Internet Nov. 6, 2007.
Evans, D. and Larachelle D., "Improving Security Using Extensible Lightweight Static Analysis," IEEE Software, 19(1):43-51 (Jan.-Feb. 2002).
Evans, D., "Policy-Directed Code Safety," Department of Electrical Engineering and Computer Science, Massachusetts Institute of Technology, 135 pages, Oct. 1999.
Evans, D., "Policy-Directed Code Safety," Proceedings of the IEEE Symposium on Security and Privacy, Oakland, CA, (May 1999).
Feng, H., et al., "Anomaly Detection using Call Stack Information," IEEE Security and Privacy, Oakland, CA, 14 pages (May 2003).
Fink, G. and Bishop, M., "Property-Based Testing: A New Approach to Testing for Assurance," ACM SIGSOFT Software Engineering Notes, 22(4): 74-80 (Jul. 1997).
Forrest, S., et al., "A Sense of Self for Unix Processes," Proceedings of the IEEE Symposium on Security and Privacy, Oakland, CA, 9 pages (May 1996).
Foster, J., et al., "A Theory of Type Qualifiers," Proceedings of the 1999 ACM SIGPLAN Conference on Programming Language Design and Implementation (PLDI), Atlanta, GA, 12 pages (May 1999).
Frantzen, M. and Shuey, M., "StackGhost: Hardware Facilitated Stack Protection," Proceedings of the 10th USENIX Security Symposium, Washington, DC, 11 pages (Aug. 2001).
Ganapathy, V., et al., "Buffer Overrun Detection using Linear Programming and Static Analysis," Proceedings of the 10th ACM Conference on Computer and Communication Security, Washington D.C, 10 pages (Oct. 2003).

Gaurav, S., et al., "Countering Code-Injection Attacks With Instruction-Set Randomization," Proceedings of the 10th ACM Conference on Computer and Communications Security (CCS2003), Washington, DC, 9 pages (Oct. 2003).
Ghosh, A.K and O'Connor, T., "Analyzing Programs for Vulnerability to Buffer Overrun Attacks," Proceedings of the 21st NIST-NCSC National Information Systems Security Conference, 9 pages (Oct. 1998).
Goldberg, I., et al.., "A Secure Environment for Untrusted Helper Applications," Proceedings of the 6th USENIX Security Symposium, San Jose, CA, 13 pages (Jul. 1996).
Gravelle, R., "Debugging JavaScript: Beyond Alerts." Retrieved from Internet: Jun. 2009. http://www.webreference.com/programming/javascript/rg34/index.html.
Grimes, R., "Preventing Buffer Overruns in C++," Dr Dobb's Journal: Software Tools for the *Professional* Programmer, 29(1): 49-52 (Jan. 2004).
Hastings, R. and Joyce, B., "Purify: Fast Detection of Memory Leaks and Access Errors," Proceedings of the Winter 92 USENIX Conference, San Francisco, CA, 10 pages (Jan. 1992).
Haugh, E. and Bishop, M., "Testing C Programs for Buffer Overflow Vulnerabilities," Proceedings of the 10th Network and Distributed System Security Symposium (NDSS03), San Diego, CA, 8 pages (Feb. 2003).
Howard, M., "Protecting against Pointer Subterfuge (Kinda!)," Jan. 2006, 4 pages, [retrieved from Internet Feb. 26, 2016] http://blogs.msdn.com/b/michael_howard/archive/2006/01/30/520200.aspx.
http://bochs.sourceforge.net, The Open Source IA-32, 59 pages, retrieved from Internet Nov. 15, 2007.
Hunt, G. and Brubacher, D., "Detours: Binary Interception of Win32 Functions," Jul. 1999, 9 pages, Retrieved from the Internet: https://www.microsoft.com/en-us/research/publication/detours-binary-interception-of-win32-functions/.
Jim, T., et al., "Cyclone: A safe dialect of C," Proceedings of the USENIX Annual Technical Conference, Monterey, CA, 14 pages (Jun. 2002).
Jones, Richard W. M. and Kelly, Paul H. J., "Backwards-Compatible Bounds Checking For Arrays and Pointers in C Programs," Proceedings of the 3rd International Workshop on Automatic Debugging, Linkoping, Sweden, 29 pages (May 1997).
Kendall, Samuel C., "Bcc: Runtime Checking for C Programs," Proceedings of the USENIX Summer 1983 Conference, Toronto, Ontario, Canada, 14 pages, (Jul. 1983).
Kiriansky, V. , et al., "Secure Execution Via Program Shepherding," Proceedings of the 11th USENIX Security Symposium, San Francisco, CA, 16 pages (Aug. 2002).
Krennmair, A., "ContraPolice: a libc Extension for Protecting Applications from Heap-Smashing Attacks," www.synflood.at/contrapolice, 5 pages, retrieved from Internet, Nov. 28, 2003.
Lamport, Leslie, "Operating Time, Clocks, and the Ordering of Events in a Distributed System," Jul. 1978, Retrieved from the Internet: http://research.microsoft.com/en-us/um, pp. 558-565.
Larochelle, D. and Evans, D., "Statically Detecting Likely Buffer Overflow Vulnerabilities," 2001 USENIX Security Symposium, Washington, D. C., 13 pages (Aug. 2001).
Larson, E. and Austin, T., "High Coverage Detection of Input-Related Security Faults," Proceedings of the 12th USENIX Security Symposium, Washington, District of Columbia, U.S.A, 16 pages (Aug. 2003).
Larus, J. R., et al., "Righting Software," IEEE Software, 21(3): 92-100 (May 2004).
Lee, R. B., et al., "Enlisting Hardware Architecture to Thwart Malicious Code Injection," First International Conference on Security in Pervasive Computing, LNCS vol. 2802, pp. 237-252, (Mar. 2003).
Lhee, K. and Chapin, S., "Buffer Overflow and Format String Overflow Vulnerabilities," Software-Practice and Experience, 33(5): 423-460 (Apr. 2003).
Lhee, K. and Chapin, S., "Type-Assisted Dynamic Buffer Overflow Detection," Proceedings of the 11th USENIX Security Symposium, San Francisco, CA, 9 pages (Aug. 2002).

(56) References Cited

OTHER PUBLICATIONS

Lyashko, A., "Hijack Linux System Calls: Part II. Miscellaneous Character Drivers," Oct. 2011, 6 pages [retrieved from Internet Feb. 26, 2016] http://syprog.blogspot.com/2011/10/hijack-linux-system-calls-part-ii.html.
Messier, M. and Viega, J., "Safe C String Library V1.0.3.," www.zork.org/safestr, 33 pages, retrieved from Internet, Nov. 2003.
Necula, G., et al., "CCured: Type-Safe Retrofitting of Legacy Code," 29th SIGPLAN-SIGACT Symposium on Principles of Programming Languages (POPL), Portland, OR, pp. 128-139 (Jan. 2002).
Nergal, "The advanced return-into-libc exploits, PaX Case Study," Phrack Magazine, 58(4), 30 pages (Dec. 2001).
Oiwa, Y, et al., "Fail-Safe ANSI-C Compiler: An Approach to Making C Programs Secure," Proceedings of the International Symposium on Software Security, Tokyo, Japan, 21 pages (Nov. 2002).
Ozdoganoglu, H., et al., "SmashGuard: A Hardware Solution to Prevent Security Attacks on the Function Return Address," (Report No. TR-ECE 03-13), Purdue University, 37 pages (Nov. 2003).
Perens, Electric Fence Malloc Debugger, www.perens.com/FreeSoftware, 10 pages, (Mar. 20, 2006).
Phrack Magazine, "The Frame Pointer Overwriting," 55(9): 1-9 (Sep. 1999).
Prasad, M. and Chiueh., T., "A Binary Rewriting Defense against Stack-Based Buffer Overflow Attacks," USENIX Technical Conference, 14 pages (Jun. 2003).
Prevelakis, V. and Spinellis, D., "Sandboxing Applications" Proceedings of the 2001 USENIX Annual Technical Conference (FREENIX Track), Boston, MA, 8 pages (Jun. 2001).
Provos, N., "Improving Host Security with System Call Policies," Proceedings of the 12th USENIX Security Symposium, Washington, DC, 15 pages (Aug. 2003).
Pyo, Changwoo and Lee, Gyungho, "Encoding Function Pointers and Memory Arrangement Checking Against Buffer Overflow Attack," $4^{th}$ International Conference Information and Communications Security (ICICS), pp. 25-36 (Dec. 2002).
RATS website. Secure Software Inc., http://www.securesw.com/downloadrats.htm, retrieved from Internet 2009.
Robbins, Tim, "How to Stop a Hacker . . .", Feb. 2001, 2 pages, Retrieved from Internet: http://box3n.gumbynet.org.
Robertson, W., "Run-time Detection of Heap-based Overflows," Proceedings of the 17th Large Installation Systems Administrators Conference, San Diego, CA, 15 pages (Oct. 2003).
Rugina, R. and Rinard, M., "Symbolic Bounds Analysis of Pointers, Array Indices, and Accessed Memory Regions," Proceedings of the ACM SIGPLAN Conference on Programming Language Design and Implementation, Vancouver, BC, Canada, 14 pages (Jun. 2000).
Ruwase, O. and Lam, M.S., "A Practical Dynamic Buffer Overflow Detector," Proceedings of the 11th Annual Network and Distributed System Security Symposium, San Diego, CA, 11 pages (Feb. 2004).
Schneider, F. B., "Enforceable Security Policies," ACM Transactions on Information and System Security, 3(1): 30-50 (Feb. 2000).
Sekar, R., et al., "A Fast Automaton-Based Method for Detecting Anomalous Program Behaviors," Proceedings of the IEEE Symposium on Security and Privacy, Oakland, CA, 12 pages (May 2001).
Simon, A. and King, A., "Analyzing String Buffers in C," In Proc. Intl. Conference on Algebraic Methodology and Software Technology, LNCS 2422: 365-380 (Sep. 2002).
Simon, I., "A Comparative Analysis of Methods of Defense against Buffer Overflow Attacks," Technical report, California State Univ, 2001. [http://www.mcs.csuhayward.edu/~simon/security/boflo.html], 11 pages (Jan. 2001).
Small, C., "A Tool For Constructing Safe Extensible C++ Systems," $3^{rd}$ USENIX Conference—Object-Oriented Technologies, Portland, OR, pp. 175-184 (Jun. 1997).
Snarskii, Alexander, Freebsd libc stack integrity patch, ftp://ftp.lucky.net/pub/unix/local/libc-letter, 5 pages (Feb. 1997).
Steffen, J. L., "Adding Run-Time Checking to the Portable C Compiler," Software: Practice and Experience, 22(4): 305-316 (Apr. 1992).
Suffield, A., "Bounds Checking for C and C++," Technical Report, Imperial College, 55 pages (2003).
Tanenbaum, A S., "Distributed Operating Systems," Prentice Hall, (1995), Table of Contents included only, 4 pages, Published Date: Aug. 25, 1994.
The NX Bit. Wikipedia article, www.wikipedia.org/wiki/NXbit, 9 pages, retrieved from Internet—Feb. 3, 2009.
The PaX project. Powepoint presentation, Nov. 9, 2000, 13 pages, Retrieved from internet: http://pageexec.virtualave.net.
Vendicator, Stack Shield, "A 'stack smashing' technique protection tool for Linux," http://www.angelfire.com/sk/stackshield, 1 page, (Jan. 2000) (retrieved from Internet Feb. 2010).
Viega, J., et al., "ITS4: A Static Vulnerability Scanner for C and C++ Code," Proceedings of the 16th Annual Computer Security Applications Conference, New Orleans, LA, 11 pages (Dec. 2000).
VMware Server 2, Product Datasheet; VMWare Virtual Server, http://www.vmware.com ; retrieved from Internet, 2 pages, Feb. 3, 2010.
Wagner, D. and Dean, D., "Intrusion Detection via Static Analysis," IEEE Symposium on Security and Privacy, Oakland, CA, pp. 156-168 (May 2001).
Wagner, D., et al., "A First Step Towards Automated Detection of Buffer Overrun Vulnerabilities," Proceedings of the Networking and Distributed System Security Symposium, San Diego, CA, 15 pages (Feb. 2000).
Wahbe, R., "Efficient Software-Based Fault Isolation," Proceedings of the 14th ACM Symposium on Operating System Principles, Asheville, NC, 14 pages (Dec. 1993).
Wheeler, David, Flawfinderwebsite, retrieved from Internet: https://www.dwheeler.com/flawfinder/, 11 pages, (Jun. 2001).
Wojtczuk, R., "Defeating Solar Designer's Non-executable Stack Patch," http://www.openwall.com, 11 pages (Jan. 1998).
www.cert.org, Computer Emergency Response Team (CERT), 2 pages, retrieved from Internet Feb. 3, 2009.
www.metasploit.org, "Metasploit Projects," 3 pages, retrieved from Internet Feb. 3, 2009.
X86 Assembly Guide, University of Virginia Computer Science CS216: Program and Data Representation, 17 pages, Spring 2006 [retrieved from Internet Feb. 26, 2016] http://www.cs.virginia.edu/~evans/cs216/guides/x86.html.
Xie, Y., et al., "ARCHER: Using Symbolic, Path-sensitive Analysis to Detect Memory Access Errors," Proceedings of the 9th European Software Engineering Conference, Helsinki, Finland, 14 pages (Sep. 2003).
Xu, J., et al., "Architecture Support for Defending Against Buffer Overflow Attacks," Proceedings of the Second Workshop on Evaluating and Architecting System dependability, San Jose, CA, 8 pages (Oct. 2002).
Xu, J., et al., "Transparent Runtime Randomization for Security," Proceedings of the 22nd International Symposium on Reliable Distributed Systems (SRDS'03), Florence, Italy, 10 pages (Oct. 2003).
Yong, Suan Hsi and Horwitz, Susan, "Protecting C Programs from Attacks Via Invalid Pointer Dereferences," Proceedings of the 9th European Software Engineering Conference, 10 pages (Sep. 2003).
Zhu, G. and Tyagi, Z., "Protection Against Indirect Overflow Attacks on Pointers," Second Intl. Workshop on Information Assurance Workshop, pp. 97-106 (Apr. 2004).
International Search Report, dated Sep. 28, 2015, for International Application No. PCT/US2015/037471, entitled "System and Methods For Automated Detection of Input and Output Validation and Resource Management Vulnerability," consisting of 4 pages.
Written Opinion, dated Sep. 28, 2015, for International Application No. PCT/US2015/037471, entitled "System and Methods For Automated Detection of Input and Output Validation and Resource Management Vulnerability," consisting of 7 pages.
International Preliminary Report on Patentability, dated Dec. 27, 2016, for International Application No. PCT/US2015/037471, entitled

(56) References Cited

OTHER PUBLICATIONS

"System and Methods For Automated Detection of Input and Output Validation and Resource Management Vulnerability," consisting of 9 pages.

* cited by examiner

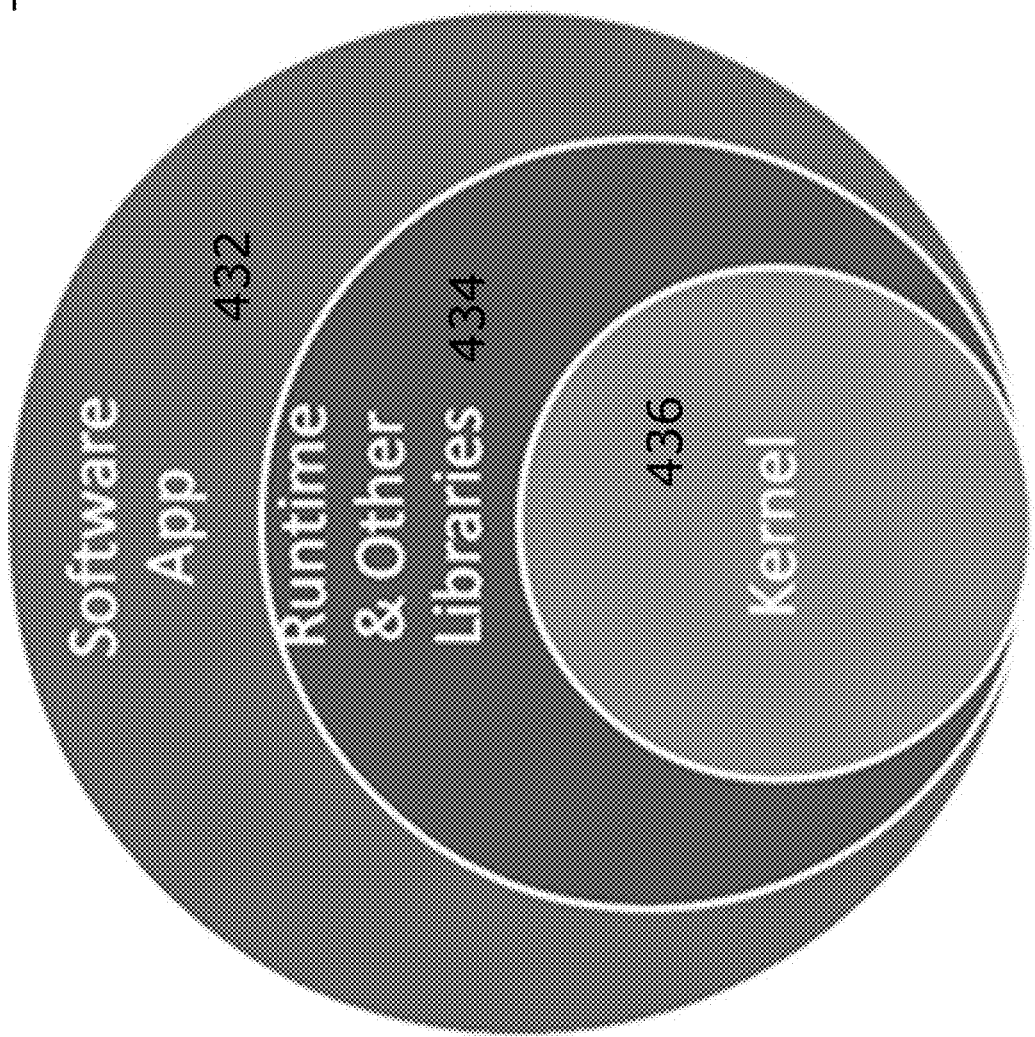

| Thread 510 | Transitions 512 | Histogram (Time/Count/ Other Metric) 514 |
|---|---|---|
| 1 | Fx -> Fr, Si, Sc, Sd | N |
| 2 | Fs -> Fz, Sf, Sh, Sj | X |
| : | | |
| 10 | Fp -> Fd, Su, St | Q |

| Thread Function 522 | Histogram 524 | Metric Time Column Chart 526 | Start SMART Stress 528 | End 530 | Type 532 | Action/Spleen/Body/Return 534 | New Input Kidney/Code Stress Value 536 |
|---|---|---|---|---|---|---|---|
| ThH 522a | f:>f: 524a | Time t 526a | SSr 528a | ffc 530a | Resource 532a | fresh 534a | 0x0A0AEEF 536a |
| ThR 522b | f:>fq 524b | Time d 526b | SSb 528b | ffb 530b | Code 532b Exerciser | Input Parameter 534b | 0x0AABBBB 536b |
| ThO 522c | fm>fw 524c | Time s 526c | SSn 528c | ffn 530c | Code 532c Exerciser | Code Body 534c | Replacement Code 536c |

FIG. 5B

SYSTEM AND METHODS FOR AUTOMATED DETECTION OF INPUT AND OUTPUT VALIDATION AND RESOURCE MANAGEMENT VULNERABILITY

RELATED APPLICATION(S)

This application is a continuation of U.S. application Ser. No. 15/318,429, filed Dec. 13, 2016, which is the U.S. National Stage of International Application No. PCT/US2015/037471, filed Jun. 24, 2015, which designates the U.S., published in English, and claims the benefit of U.S. Provisional Application No. 61/998,318, filed on Jun. 24, 2014. The entire teachings of the above applications are incorporated herein by reference.

BACKGROUND

Testing even simple commercial computer applications can be extremely complex because the number of independent code paths to be tested can be very large. Each of these code paths, in turn, is composed of a very large number of individual functions, which may be composed of one or more blocks of non-adjoining instructions that further complicate testing. There is a need in the computer industry for an approach that performs such complex testing in an efficient manner.

SUMMARY

The present disclosure is directed to systems and methods that automate detection of input/output validation (e.g., testing) and output resource management vulnerability. The systems and methods may analyze a set of computer routines. The analysis may include a determination of a likelihood of vulnerability to unexpected behavior for one or more computer routines of the set. Based upon the analysis, the systems and methods may identify the one or more computer routines of the set having the likelihood of vulnerability. The systems and methods may asynchronously and dynamically manipulate at least one of the one or more computer routines through a testing technique. The systems and methods may determine unexpected behavior of at least one of the one or more computer routines.

In some embodiments, the systems and methods may deploy one or more patches to correct the unexpected behavior of at least one of the one or more computer routines. In some embodiments, the systems and methods may analyze the set of computer routines and at least one corresponding sequence of computer routines of the set.

In some embodiments of the systems and methods, the analysis may further include at least one of the following: extracting a histogram including a frequency of usage associated with at least one computer routine of the set, determining size of one or more buffer (e.g., memory segment) read or write computer operations associated with the one or more computer routines, determining the size of one or more corresponding stacks associated with the one or more computer routines, determining size of one or more memory read or write operations based upon examining a corresponding loop size, and performing taint analysis of at least one computer routine of the set. The histogram may include, but is not limited to, at least one of the following: a log file, a graph, a table, other user display and other types of display. Some embodiments may include one or more computer threads. Some embodiments may include two or more computer threads (e.g., multi-threaded). In some embodiments, a computer thread (e.g., computer thread of execution) may represent the smallest sequence of programmed instructions that can be managed independently by a scheduler (e.g., a method by which resources are assigned to complete work), which may be part of the computer operating system. In some embodiments, the computer threads may include a sequence of computer routines which may include at least (e.g., one or more) of function calls and system calls. According to some embodiments, the histogram may depict how many times a given function or system call of a computer thread of a computer application is executed.

In some embodiments of the systems and methods, the one or more computer routines may include at least one (or more) of: a function and a system call. Some embodiments of the systems and methods may manipulate the at least one of the one or more computer routines by at least one of the following: modifying data associated with the one or more computer routines, the data exceeding a corresponding buffer (e.g., memory segment) size, and modifying values that are declared in memory regions associated with (e.g., accessed by) the one or more computer routines.

Some embodiments of the systems and methods may determine unexpected behavior of at least one of the one or more computer routines including determining that a control flow of a thread associated with the one or more computer routines has changed as a result of the manipulation, determining a failure condition that caused the thread to change its control flow, and displaying the failure condition.

In some embodiments of the systems and methods, for at least one function of the one or more computer routines, the computer testing technique may provide at least one of invalid, unexpected, and random data to at least one of an input of the at least one function, logic within the at least one function, and an output of the at least one function. In some embodiments of the systems and methods, for at least one system call of the one or more computer routines, the computer testing technique may provide at least one of invalid, unexpected, and random data to a system call parameter associated with the at least one system call.

In some embodiments of the systems and methods, the system call parameter may be associated with at least one of the following: thread synchronization, process synchronization, thread scheduling, process scheduling, memory, memory allocation, memory de-allocation, memory writing, memory reading, a network socket, creation of a network socket, network socket input, network socket output, pipe creation, system input, system output, shared memory fifo creation, a terminal input, a terminal output, file handling, file creation, file writing, file reading, disk input, and disk output.

In some embodiments, the systems may include an analysis engine. The systems may also include a validation engine that may be communicatively coupled to the analysis engine (e.g., threads and processes being examined). The systems may also include an instrumentation engine that may be communicatively coupled to at least one of the analysis engine and the validation engine.

In some embodiments, the analysis engine and the validation engine may comprise a processor fabric including one or more processors. In some embodiments, the analysis engine, the validation engine, and an instrumentation engine may comprise a processor fabric including one or more processors.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

FIG. 4B illustrates an example operating environment (e.g., application environment) of the computer application, according to embodiments of the present disclosure.

FIG. 5A illustrates a histogram according to embodiments of the present disclosure.

FIG. 5B illustrates a list of system resources on which stress testing may be performed and a list of attack vectors, according to embodiments of the present disclosure.

DETAILED DESCRIPTION

A description of example embodiments of the disclosure follows.

The teachings of all patents, published applications and references cited herein are incorporated by reference in their entirety.

Some embodiments may help in improving robustness of not only the basic functionality of software (e.g., computer applications), but also software error handling functionality, and may also exercise those code paths that are too difficult to reach when a test suite designed to exercise and test the functionality of the application is executed. In some embodiments, such software testing can be automated in a user friendly manner. In some embodiments, the status of software testing may be displayed to testers, developers, and management of the company developing the software under test.

Figure 1A:
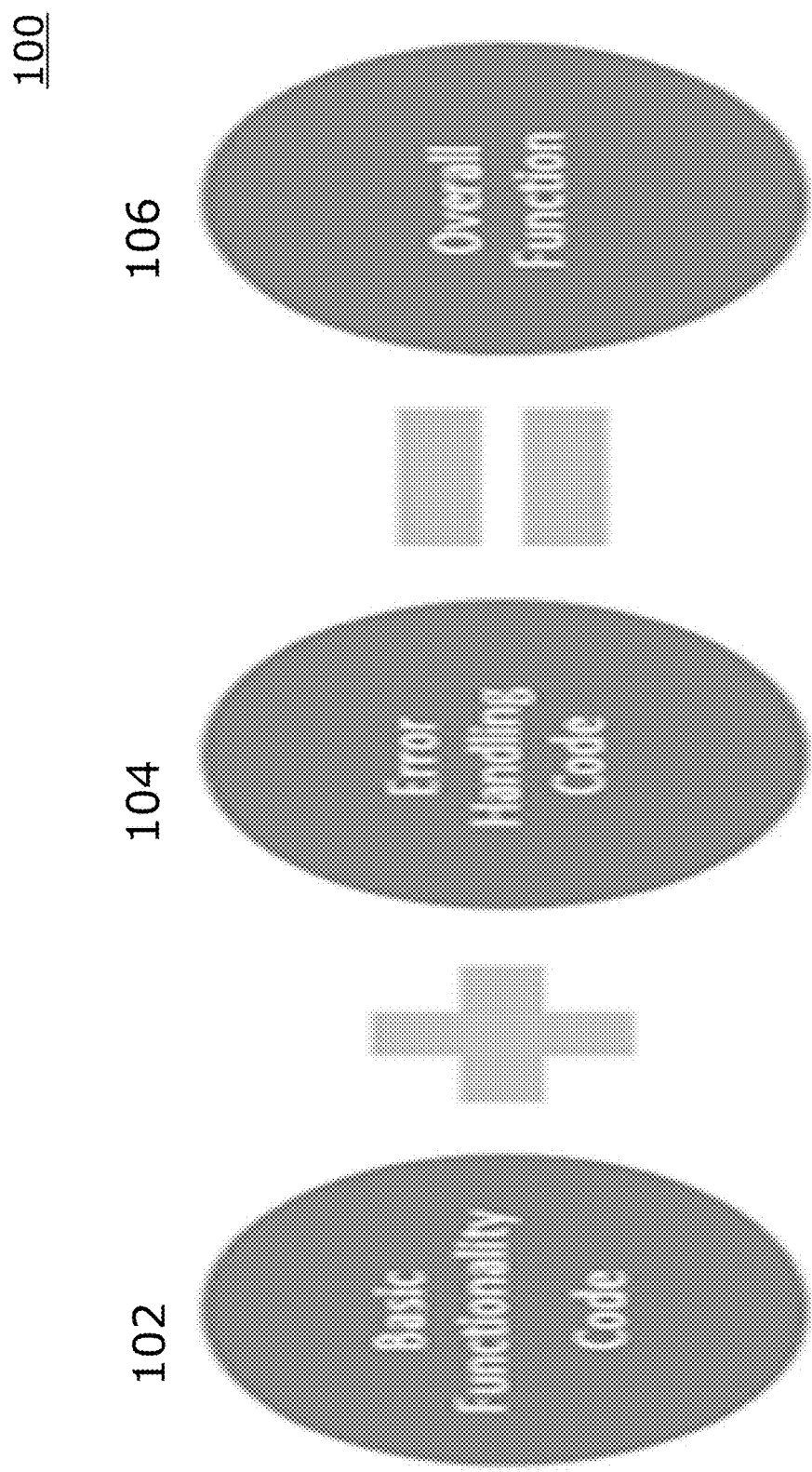
FIG. 1A illustrates a given function that may include functionality and also may include error handling capabilities, in embodiments of the present disclosure.

Multi-State Stress and Computer Application Execution:

FIG. 1A is an illustration of an embodiment 100 that includes a given function 106 that may include functionality 102 and also may include error handling capabilities 104, according to embodiments of the present disclosure. Individual functions 106 may include computer code (also known as "code") for basic functionality 102 as well as code for error handling scenarios 104. Computer applications may be constructed using a plethora of internal, but independent, code paths that, collectively, may implement functionality offered by a given computer application. A function may include code that implements basic functionality 102, or code that implements error handling 104 capabilities, or a combination of both types of code. Some computer code may be intended for basic functionality 102 (e.g., known as "sunny side" code, or basic functionality code) and not specifically directed to handle errors. By contrast, error handling code 104 may implement functionality to recover when the basic functionality code encounters unexpected run time situations, including but not limited to lack of a resource and/or unexpectedly large input data.

Testing of computer routines (including but not limited to functions, system calls, and other types of computer routines) to detect and handle errors may be complex. Cyclomatic complexity is a measure of the number of linearly independent paths (e.g., independent code paths) through a computer application's source code. Some computer application may be very complex and more difficult to stress test. As such, error handling in larger computer applications is of great importance. Therefore, some embodiments exercise and check the error handling functionality (e.g., capabilities) of computer routines (including but not limited to functions or system calls).

Figure 1B:
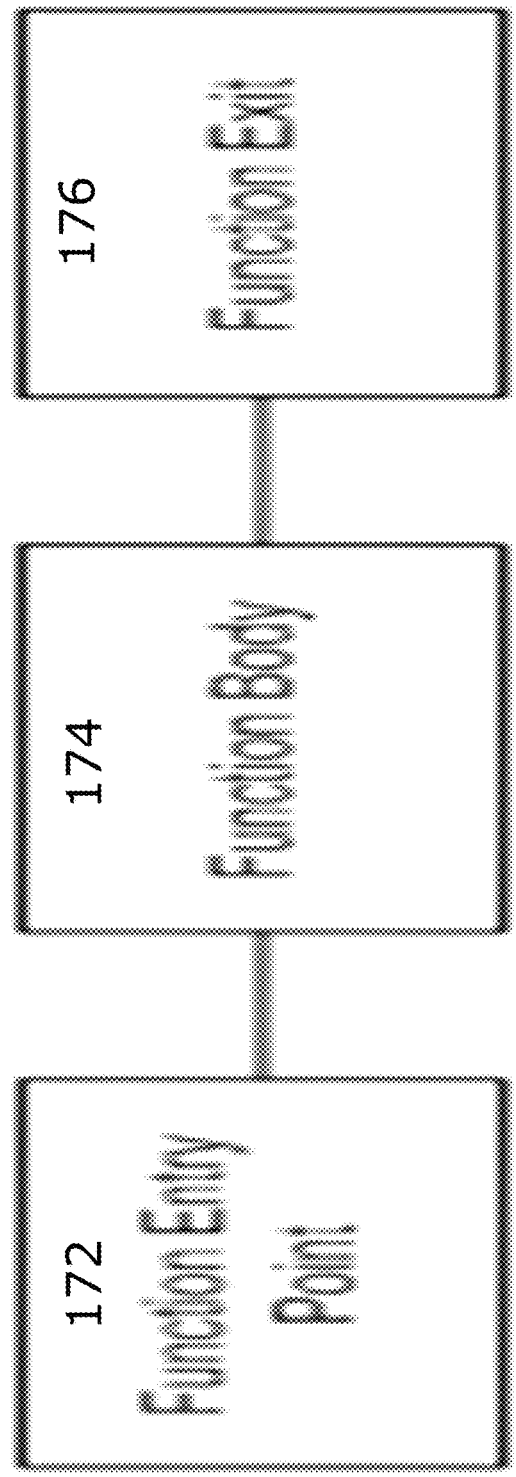
FIG. 1B illustrates the state of a given function, according to embodiments of the present disclosure.

FIG. 1B illustrates the state of a computer routine (including, but not limited to functions, API calls and system calls), according to embodiments of the present disclosure. As illustrated in FIG. 1B, in some embodiments, a computer routine 170 (including but not limited to a function and system call) on each independent code path may be subjected to stress (e.g., stress tests or manipulation of the computer routine) at one or more of the following three states: (1) at the start 172 of a computer routine on an independent code path, (2) in body 174 (or middle) of a computer routine on an independent code path, and, (3) at the end 176 of execution of a computer routine on an independent code path.

In some embodiments, differences exist between the states. In some example embodiments, (1) applying stress on an input may help to find the function or system call's vulnerability against erroneous (e.g., bad) input. In some example embodiments, (2) changing data in the body of the function may serve to exercise code paths in the function that are not otherwise easily exercised. In some example embodiments, (3) artificially changing the output values may create unusual conditions, so that error conditions and/or exception handling code may be exercised. According to some example embodiments, the first two states (1) and (2) may therefore be considered as "Code Exercise Test" states and the third state (3) may be considered as a "Negative Test" state.

However, in some embodiments, such stress (e.g., stress tests) are not limited to being applied at only three states, and may be applied at four or more states. Some embodiments may include a fourth state (4) which may be time dependent. In some example embodiments, for code that executes repeatedly, stress may be applied to a given instance of invocation. In an example embodiment, stress may be applied on the N-th (e.g., first, hundredth, or other number) instance of execution.

Some embodiments, before applying stress testing, may identify at least one of critical and high value computer routines (e.g., at least one of functions, system calls, and other computer routines). As such, to follow, this disclosure describes methods (and systems) of identifying at least one of critical and high value functions and then subjecting these functions to the three-state stress described above.

Figure 2:
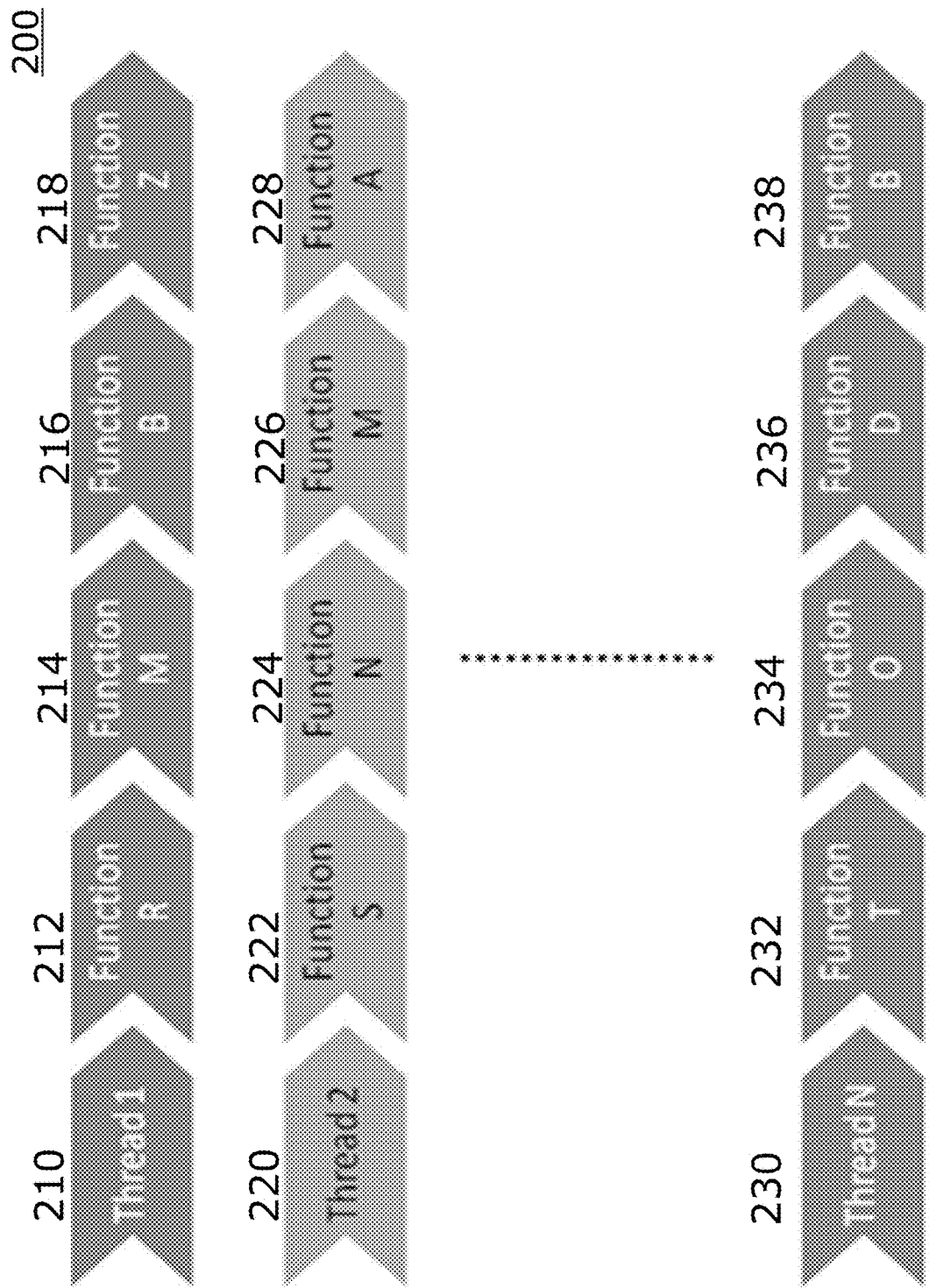
FIG. 2 illustrates execution of a computer application creating one or more threads that, in turn, may execute one or more functions, in embodiments of the present disclosure.

FIG. 2 illustrates a computer application executing 200, which may create one or more threads (collectively, 210, 220, 230) that, in turn, may execute one or more functions (collectively, 212, 214, 216, 218, 222, 224, 226, 228, 232, 234, 236, and 238) in embodiments of the present disclosure. According to some embodiments, FIG. 2 may be considered to represent the set of function call stacks for the threads (collectively 210, 220, 230). As mentioned above, the computer application under test may include several independent code paths. Some embodiments may overcome deficiencies of existing approaches, such as deficiencies in which it is difficult to test a number of desired code paths in a timely manner. Given that software product vendors may make a commercial decision to release a product when a certain percentage of independent code paths are tested, it is preferable to generate a prioritized list of functionality that is critical for the functioning of the application. Some embodiments test at least these critical functionality, enabling software vendors to lower the risk of software failing. In some embodiments, remaining independent code paths can also be tested and product patches may be released. Some embodiments may execute a test suite, and then may extract a list of critical functionality by determining which functions may be executed more frequently than other functions (or which functions take a greater percentage of time when the test suite runs). The list of critical functionality may include a set of call graphs for one or more threads within the computer application. The call graphs may include one or more continuous real time listings of functions from owned code, as well as from third party libraries, such as runtime and third party libraries used by a computer application. The call graph may further include one or more continuous real time listings of system calls interspersed between the aforementioned function calls made periodically by the computer application. In this manner, according to some embodiments, a complete real time state transition listing of the computing environment of each thread of the computer application may be captured.

Detection Process

Figure 3:
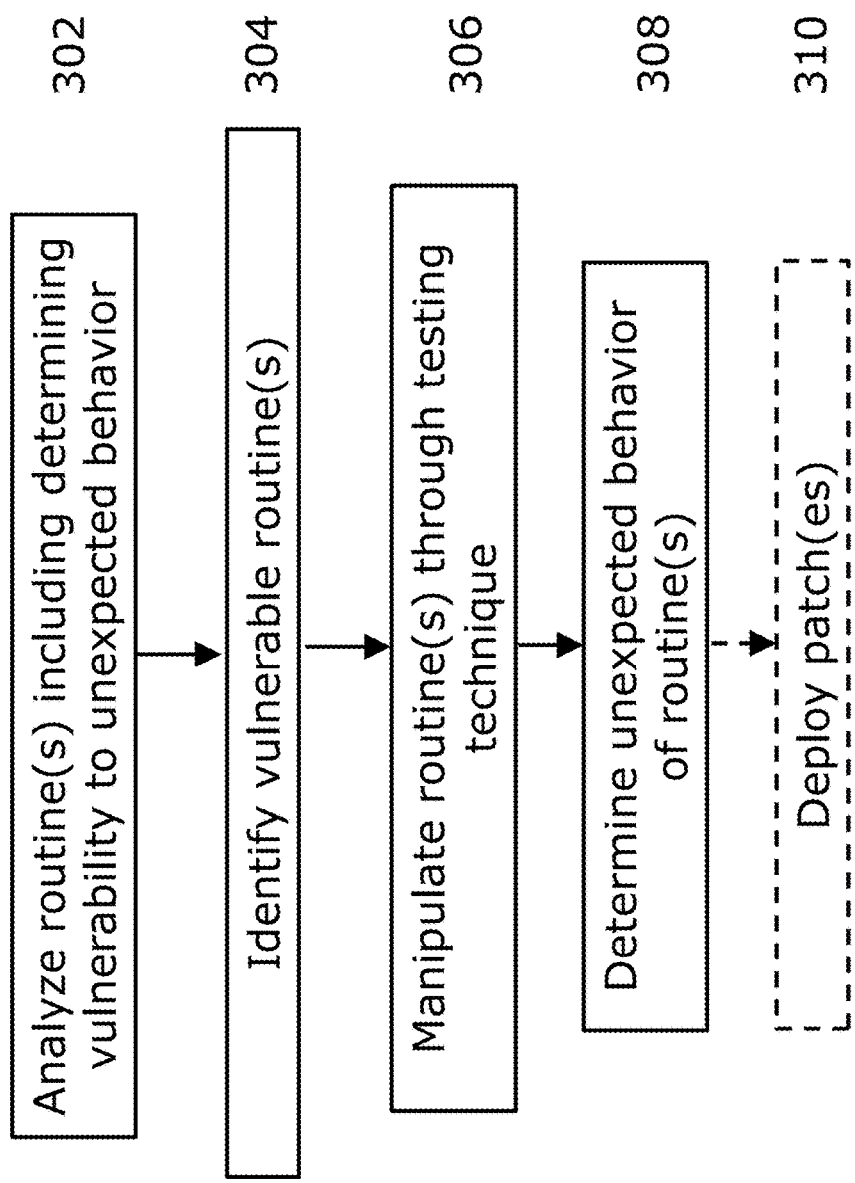
FIG. 3 illustrates a flowchart of an example method (and system) for automating detection of input/output validation and output resource management vulnerability, in embodiments of the present disclosure.

FIG. 3 illustrates a flowchart of an example method for automating detection of input/output validation and output resource management vulnerability, in embodiments of the present disclosure. The flowchart in FIG. 3 illustrates a method (and system) 300 that automates detection of input/output validation and output resource management vulnerability. The method (and system) 300 may analyze a set of computer routines 302. The computer routines may include at least one of functions, API calls, system calls, and other types of computer routines. The analysis may include a determination of a likelihood of vulnerability to unexpected behavior for one or more computer routines of the set. Based upon the analysis, the method (and system) 300 may identify 304 the one or more computer routines of the set having the likelihood of vulnerability. For example, some embodiments may identify one or more computer routines, including but not limited to identifying functions and system call sequences used by one or more threads, for each use case, in order to map the run time control flow of a computer application. The method (and system) 300 may asynchronously (e.g., multi-threaded) manipulate at least one of the one or more computer routines through a testing technique 306. The method (and system) 300 may also dynamically (e.g., at run time, rather than at compile time) manipulate at least one of the one or more computer routines through a testing technique 306. However, the method (and system) is not so limited, and some embodiments may perform manipulation synchronously (e.g., single-threaded) and/or statically (e.g., at compile time, rather than run time).

As part of the manipulation, some example embodiments may fuzz (e.g., perform fuzz testing on, including but not limited to providing invalid, unexpected, and random data to the inputs of) the computer routine (e.g., including but not limited to a function or system call) with data larger than the buffer size (e.g., memory segment size) to examine if it is vulnerable to buffer error vulnerability. Some example embodiments may perform fuzzing using string inputs larger than the stack size.

Some example embodiments may fuzz numbers (e.g., which may include parameters, input and output values) that are declared in memory regions that may (or may not) be provided by users by one or more of the following: (1) some example embodiments may change numbers to be larger than a given architecture size (such as 8/32/64-bit or N-bit architecture size) if the underlying instructions are math operations, including but not limited to add, subtract, multiply and/or divide operations; (2) some example embodiments may change the sign of such numbers; (3) some example embodiments may change the value of such numbers to zero, if the disassembly (conversion of a program from its executable form into a form of assembler language that is readable by a human), shows division type operation and/or if the number is used as an address; and (4) other method(s) of fuzzing numbers. Numbers may include integers and/or floating point numbers (including but not limited to single-precision, double-precision, N-bit precision, and/or other types of precision) and may include a corresponding sign.

In order to achieve the manipulation of the one or more computer routines (for example, fuzz input and/or output values), some embodiments may modify one or more stacks (e.g., computer stack arrays) in computer memory. In order to achieve the manipulation, some embodiments may modify the stack pointer and/or the values within the stack. In order to achieve the manipulation, some embodiments may modify one or more of the following computer registers: the EAX (accumulator register), EBX (base register), ECX (counter register), EDX (data register), ESI (source index register), EDI (destination register), EBP (base pointer), and/or ESP (stack pointer), other registers, and other pointers.

The method (and/or system) 300 may determine unexpected behavior of at least one of the one or more computer routines 308. Some example embodiments may check to see if the control flow of the thread changed as a result of fuzzing by comparing the control flow extracted with and without that function or system call being attacked. Some example embodiments may identify the precise failure that caused the thread to change its control flow. Some embodiments may report the unexpected behavior to a display (e.g., dashboard) in the form of a failure condition being displayed, in a standard format, including but not limited to a syslog format and/or other formats.

In some embodiments the technique used to fuzz a function may include providing fake (e.g., false or unexpected) input and letting the function execute with the manipulated input. In some embodiments, a system call may execute normally, but fuzzing may overwrite the system call's result before it is read by an entity making the system call. As such, in some embodiments, the method (and system) of fuzzing may be different between functions and system calls.

In some embodiments, the method (and/or system) 300 may optionally deploy 310 one or more patches to correct the unexpected behavior of at least one of the one or more computer routines. In some embodiments, the method (and/or system) may analyze the set of computer routines and at least one corresponding sequence of computer routines of the set.

In some embodiments of the method (and/or system), the analysis 302 may further include at least one of the following. Some embodiments may extract a histogram including a frequency of usage associated with at least one computer routine of the set. Some example embodiments may extract a histogram of the most commonly used functions and system calls. Some embodiments may determine size of one or more buffer read or write computer operations associated with the one or more computer routines. Some embodiments may determine size of one or more corresponding stacks associated with the one or more computer routines. Some example embodiments may identify functions that include large buffer read and/or write operations and/or their corresponding stack sizes at the time of creation of the stack. Some embodiments may determine size of one or more memory read or write operations based upon examining a corresponding loop size. Some embodiments may perform taint analysis of at least one computer routine of the set. Some embodiments may identify at least one instruction associated with the one or more computer routines, the at least one instruction performing a computer operation that includes at least one of incrementing a value, decrementing a value, adding a value, subtracting a value, multiplying a value, and dividing a value. Some example embodiments may identify computer instructions (e.g., computer routines) that perform math operations, including but not limited to increment, decrement, add, subtract, multiply, and/or divide, of two or more numbers. Some example embodiments may determine if at least one of the two or more numbers are in user-provided input by performing taint analysis.

In some embodiments of the method (and/or system), the one or more computer routines may include at least one of: a function and a system call. Some example embodiments may identify the functions and system call sequences used by each thread for each use case to map the run time control flow of an application.

Some embodiments of the method (and/or system) may manipulate 306 the at least one of the one or more computer routines by at least one of the following: modifying data associated with the one or more computer routines, the data exceeding a corresponding buffer size, and modifying values that are declared in memory regions associated with the one or more computer routines.

Some embodiments of the method (and/or system) may determine unexpected behavior 308 of at least one of the one or more computer routines including determining that a control flow of a thread associated with the one or more computer routines has changed as a result of the manipulation, determining a failure condition that caused the thread to change its control flow, and displaying the failure condition.

In some embodiments of the method (and/or system), for at least one function of the one or more computer routines, the computer testing technique in 306 may provide at least one of invalid, unexpected, and random data to at least one of an input of the at least one function, logic within the at least one function, and an output of the at least one function. In some embodiments of the method (and/or system), for at least one system call of the one or more computer routines, the computer testing technique may provide at least one of invalid, unexpected, and random data to a system call parameter associated with the at least one system call.

In some embodiments, a system call parameter may include a return value of a system call. As such, in some embodiments, the system call return value may be "overwritten" by a known system call parameter (e.g., system call return value or system call error code) with a fake (false or unexpected) result.

In some embodiments of the system (and/or system), the system call parameter may be associated with at least one of the following: thread synchronization, process synchronization, thread scheduling, process scheduling, memory, memory allocation, memory de-allocation, memory writing, memory reading, a network socket, creation of a network socket, network socket input, network socket output, pipe creation, system input, system output, shared memory fifo creation, a terminal input, a terminal output, file handling, file creation, file writing, file reading, disk input, and disk output.

In some embodiments, the systems may include an analysis engine. The systems may also include a validation engine that may be communicatively coupled to the analysis engine (e.g., threads and processes being examined). The systems may also include an instrumentation engine that may be communicatively coupled to at least one of the analysis engine and the validation engine.

Figure 4A:
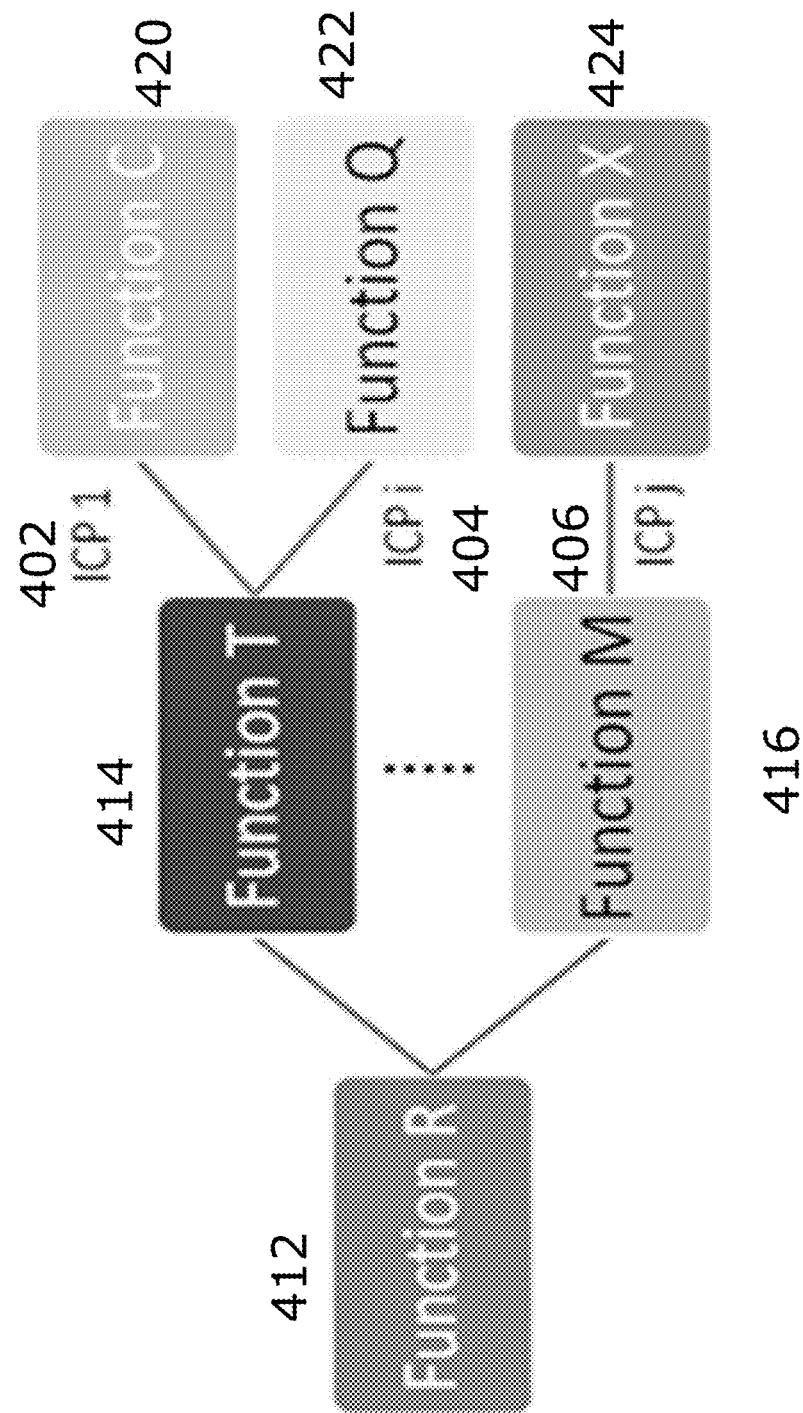
FIG. 4A illustrates how one or more features in a computer application may include one or more independent code paths, which in turn may execute one or more different sets of functions in embodiments of the present disclosure.

Computer Operating Environments and Resources:

FIG. 4A illustrates how one or more features 410 in a computer application may include one or more independent computer code paths (collectively, 402, 404, 406 in FIG. 4A), which, in turn, may execute one or more different sets of computer routines (collectively, 412, 414, 416, 420, 422, and 424 in FIG. 4A), which may include functions and/or system calls, in embodiments of the present disclosure. Although six computer routines (412, 414, 416, 420, 422, and 424) and three code paths (402, 404, and 406) are shown in FIG. 4A, embodiments are not so limited and may include several code paths (e.g., N or more code paths) and several computer routines (e.g., M or more computer routines).

In some embodiments, the computer routines (collectively, 412, 414, 416, 420, 422, and 424 in FIG. 4A) may execute in a certain sequence, in order to implement functionality associated with one or more use cases of a computer application. In some embodiments, the state of the computer application may be determined by examining the sequence of computer routines executed at a given moment of time.

In some embodiments, testing of software may be accomplished by a combination of manual and/or automated methods that exercise independent code paths. In some embodiments, the set of independent code paths may be a very large vector space. Therefore, the number of tests to be performed may be very large. Given that manual testing of the large vector space may be cumbersome, as timely creation of dependencies that may be required by the test suite rests squarely on the tester, some embodiments provide automated testing. Therefore, executing the test suite in a repeatable manner when feature-functionality changes may be challenging.

To overcome this challenge, some embodiments provide an advantage in that automated testing methods (and systems) of some embodiments do not require that dependencies including test files, input data, system resources, hardware to be ready prior to the launch of the test suite. As such, some embodiments overcome the deficiencies of existing approaches, which require dependencies to be available to avoid resulting failures.

FIG. 4B illustrates an example operating environment 430 of the computer application, according to embodiments of the present disclosure. As illustrated in FIG. 4B, in some embodiments, as the computer application executes 432, it may interact with other parts of the computer application 432, other libraries in the computer application 434, and/or the kernel (and/or operating system) 436.

As the test suite executes, the application may experience stress due to minor variations in the environment in which the application operates. In some embodiments, the operating environment 430 may include the kernel 436, the runtime libraries 434 and/or other libraries 434 used by the application as well as the external data that is presented to the application 432. To test the computer application 432, some embodiments create variations in the operating environment using automated mechanisms.

In some embodiments, other runtime stress may be introduced in real time through a runtime computer routine's (such as an API, function, or system call) "hooking" of kernel 436, library 434, and raw application 432 computer code. As known in the art of computer programming, "hooking" may include one or more of a range of techniques to alter behavior of applications, of an operating system, and/or other software components by intercepting computer routine calls, messages and/or events passed between software components (including but not limited to the software components illustrated in FIGS. 4A-4B).

In some embodiments, external data input stress may be introduced in real time by changing either the runtime arguments presented to a computer routine (including but not limited to an API and/or a function and/or system call), and/or by changing the body of a given computer routine at run time, and/or even be percolated upwards into the call stack by changing the return value of a given library and/or user functionality at run time.

Figure 4C:
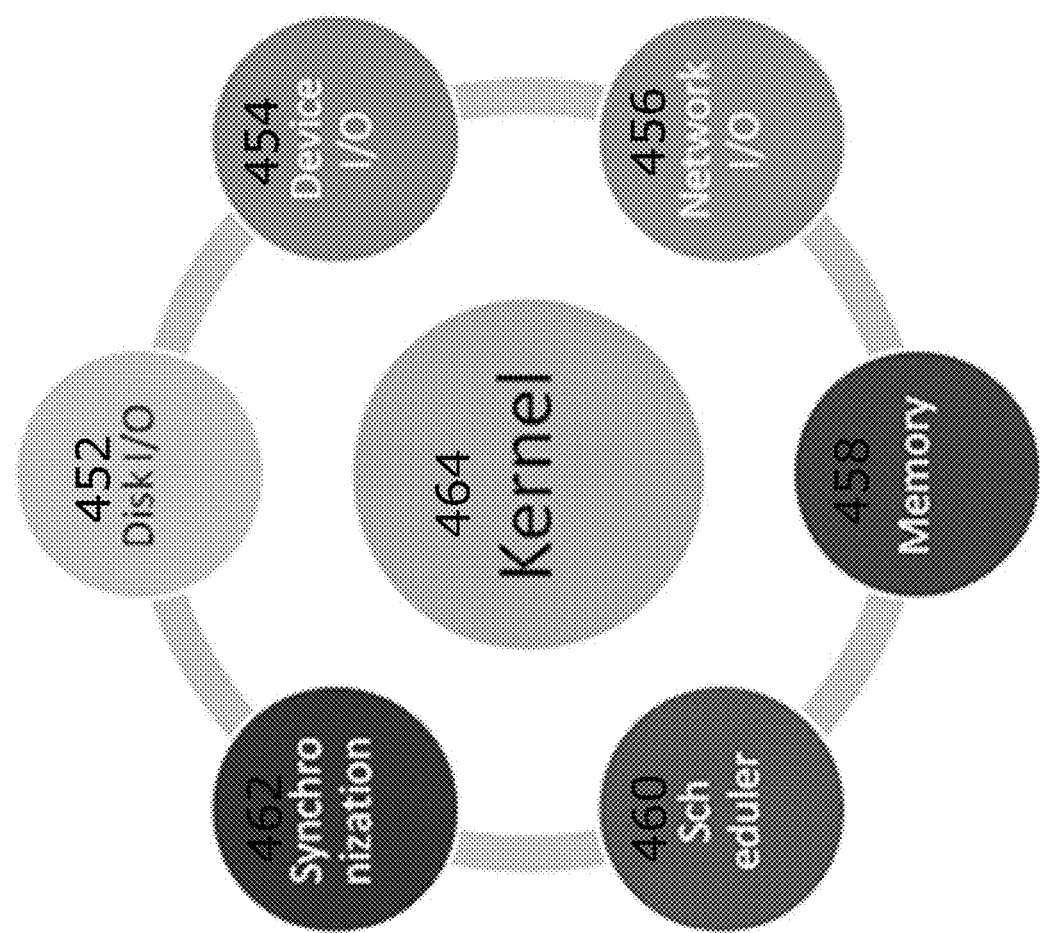
FIG. 4C illustrates different types of system resources, according to embodiments of the present disclosure.

FIG. 4C provides an illustration of different types of system resources (collectively 452, 454, 456, 458, 460, and 462) that may be associated with an operating system kernel 464, according to embodiments of the present disclosure. System Resource stress may be introduced via real time injection through the system call interface. Such real time injection may include manipulation of one or more inputs and/or outputs and/or behaviors of a system call, but is not so limited. System resource functionality 450 that may be so manipulated may include one or more of the following types of system resource functionality 450 (accessible through system calls and/or other means) but is not so limited: (1) thread and/or process synchronization 462; (2) thread and/or process scheduler 460; (3) memory, memory write/read, memory allocation/de-allocation 458; (4) network socket creation, network socket input and/or output 456; (5) terminal input and/or output 454; (6) disk input and/or output 452; and (7) pipe creation, system input/output, shared memory fifo creation, file handling, file creation, file writing, and/or file reading.

Stress-Testing Displays:

FIG. 5A illustrates a histogram 500 according to embodiments of the present disclosure. A histogram 500 may include a graphical representation of distribution of numerical data. The histogram may include, but is not limited to, a web dashboard, a log file, a graph, table, and/or other user display and/or other type of display. The histogram may enable a user to determine how many computer routine (e.g., API and/or function and/or system call) failures are detected. According to some embodiments, the histogram 500 may depict how many times 514 a given computer thread 510 (leftmost column of FIG. 5A, a thread having a sequence of computer routines which may include function calls and/or system calls) of a computer application as executed. The middle column of FIG. 5A illustrates transitions between computer routines (function and/or system calls) associated with the call graph for a given thread 510. In some embodiments, by identifying the most frequent threads of execution through a histogram metric 514 (such as time, and/or count which may include a number and/or numerical value, and/or another metric), a tester (e.g., automated test machine and/or process and/or end user tester) may prioritize a testing effort.

FIG. 5B illustrates a list of system resources on which stress testing may be performed for one or more threads 522, according to embodiments of the present disclosure. Each row of the table 520 in FIG. 5B may represent a specific attack vector. As in FIG. 5A, in FIG. 5B each thread 522 (collectively 522a, 522b, 522c) may have an associated transition 524 (collectively, 524a, 524b, 524c) and histogram metric 526 (collectively 526a, 526b, 526c). In FIG. 5B, the underlying stress may be applied to a stress type 532, including but not limited to a resource (e.g., system resource, or "resource") and/or to an API (Application Programming Interface and/or function and/or "code exerciser"). The stress may be applied to a starting address 528 (collectively 528a, 528b, 528c) and/or ending address 530 (collectively 530a, 530b, 530c), which may be one or more addresses in computer memory (including but not limited to memory addresses and/or pointers on one or more computer stacks). The "new input" column 536 may represent one or more input values 536b, and/or code body values 536c, and/or return values 536a each of which may be applied in the stress test. In an example embodiment shown in FIG. 5B, a return value 536a of 0xDEADBEEF may be applied to a stress type 532 having a system resource 532a during a next action 534 associated with the function transition from function Fz to function Fr 534a. Also as illustrated in FIG. 5B, an input parameter 534b having input values 536b (0xAAAAAA and 0xBBBBBB) may be applied to a stress type 532 having a code exerciser 532b (including, but not limited to, a function exerciser). Also as illustrated FIG. 5B, replacement code 536b may be applied to a code body 534c as the next action in a code exerciser 532c stress test. In some embodiments, a tester may choose to apply stress in the input stage of the system call (and/or API and/or function call) 534b, and/or on the output stage of the system call 534a. As illustrated in FIG. 5B, in the case of system resource stress, a tester may change the return value 536a of the system call to make a higher layer of the computer application interpret that an underlying system call failed.

Figure 6:
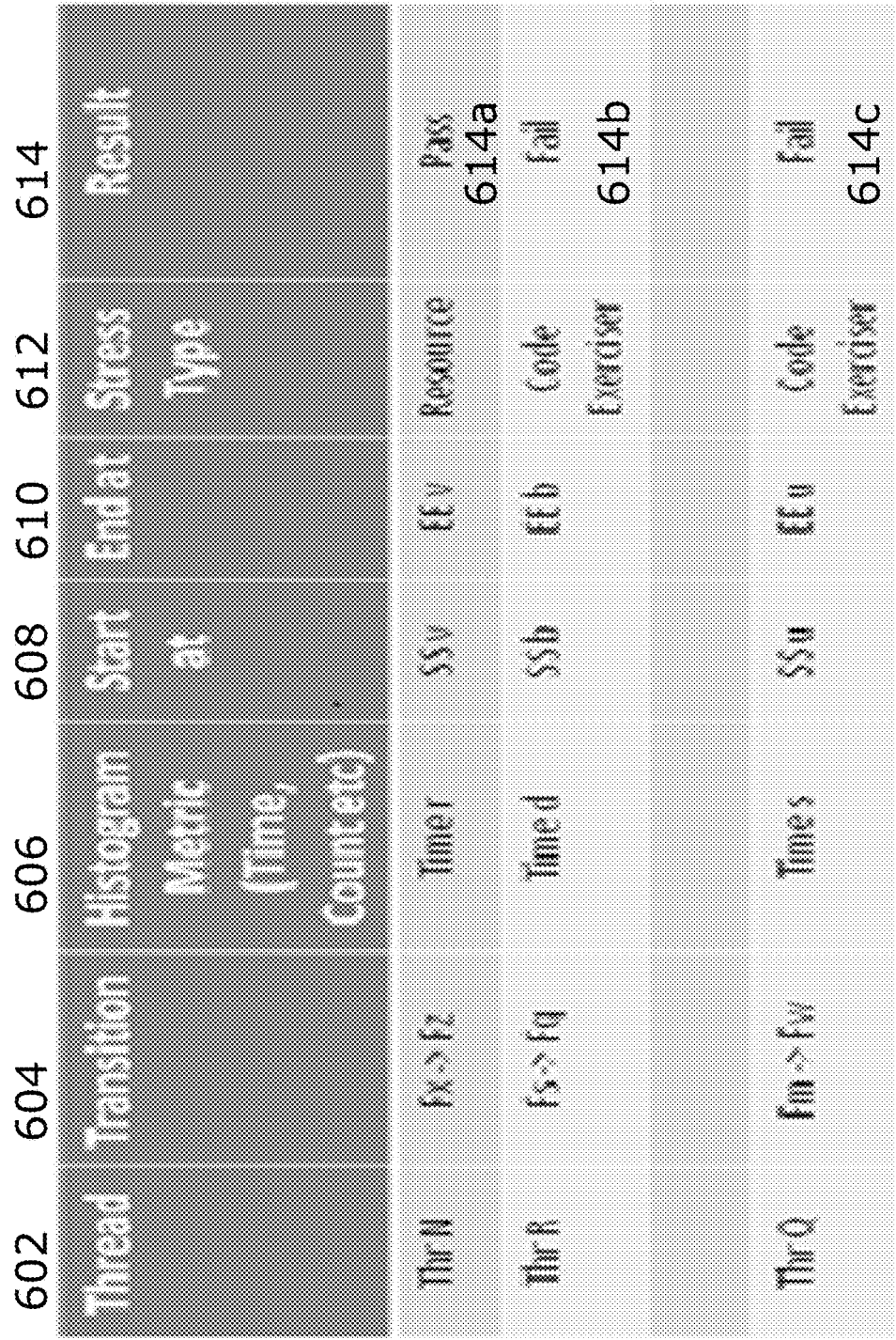
FIG. 6 illustrates the results of a stress test on a dashboard, according to embodiments of the present disclosure.

As such, FIG. 6 illustrates the pass/fail results 614 (614a, 614b, 614c) of a stress test on a computer dashboard 600 (also known as dashboard and/or web dashboard), according to embodiments of the present disclosure. In some embodiments, a computer dashboard may include a real-time, easy-to-read, and single page graphical presentation of status and trends. In some embodiments, a dashboard may be analogous to a report and/or progress report. In some embodiments, a dashboard may be continuously updated and/or periodically updated.

As illustrated in FIG. 6, each row may be considered as an attack vector, including a respective thread 602, transition 604, histogram metric 606, start address 608, end address 610, stress type 612, and pass or fail result 614. As illustrated in FIG. 6, by returning different failure codes, the tester may simulate various failure conditions and observe how the computer application responded. If the computer application thread 602 executes the next transition 604 as specified in the next action column, and/or if the computer application takes a handled exception, the computer application may be flagged as handling the real time stress appropriately. On the other hand, if the computer application takes an unhandled exception, the computer application may have an input validation and/or resource management vulnerability, in which case the computer application may be flagged as handling the real time stress inappropriately.

Once the list of targeted stress is set up, a test suite may be used to exercise the application under test. Some embodiments may cause the execution of the appropriate stress in the stress vector set up by the tester. For situations where the stress is a negative stress, which tests a code block's handling of invalid input and/or unexpected behavior in regards to the code block's functionality (e.g., exception handling), some embodiments may report the success and/or failure of the stress vector by observing the next transition after the test. Negative stress that causes the application to crash or hang may be reported on a dashboard and/or web portal 600. For code exerciser tests, normal testing may continue and other logical, performance, load, runtime, resource exhaustion, and security testing may continue.

In some embodiments, for each critical function transition on the call graph, a tester can set up the aforementioned variety of stress using a graphical user interface or the command line. In some embodiments, for each stress instance, a few fixed parameters may be provided. In some embodiments, these fixed parameters may include (a) the function transition boundary, (b) the thread number, (c) the instance count at which the stress may be applied and/or (d) the instance count at which the stress may be removed. In some embodiments, the tester may also indicate if the stress instance is a code exerciser stress, and/or a negative test, which tests a code block's handling of invalid input and/or unexpected behavior in regards to the code block's functionality (e.g., exception handling). If the stress is a negative stress (e.g., a stress associated with a negative test), then the tester may also specify the next transition that may occur for the stress test to pass and for the stress test to fail.

According to some embodiments, the following indicates how each variable parameter of the stress may be reflected in a list, such as the dashboard of FIG. 6. For injecting system resource stress into a targeted function transition, the tester may select a return value that represents a specific resource failure. For example, the tester may select an out of memory, out of disk space, socket disconnected, and/or file does not exist type of system resource error. For owned or third party application code stress, the tester may indicate the state at which stress should be applied. In some embodiments, state types may include: at the input, body, and/or end of the targeted function or API. For input parameter stress, where the data type is a simple type, the user may specify an alternate value. Likewise for simple return values, the user may specify an alternate return value. For complex data types, the tester may provide an alternate body of code. Some embodiments may compile and/or link computer code and/or inject it into the address space of the process in real time. When the targeted function is called and the count instance conditions are satisfied, the injected functionality will be called instead of the original functionality.

In some embodiments, each of the identified critical functionality may be subjected to a variety of stress. When the aforementioned list may be exhaustively tested, the next set of critical functionality may be targeted until gradually the last of the functionality is tested. In some embodiments, one advantage of the aforementioned real time code substitution mechanism is that it may also be used to return errors, which enables hard-to-reach independent code paths to get exercised as well.

Monitoring Agent and Analysis Engine Infrastructure

Figure 7A:
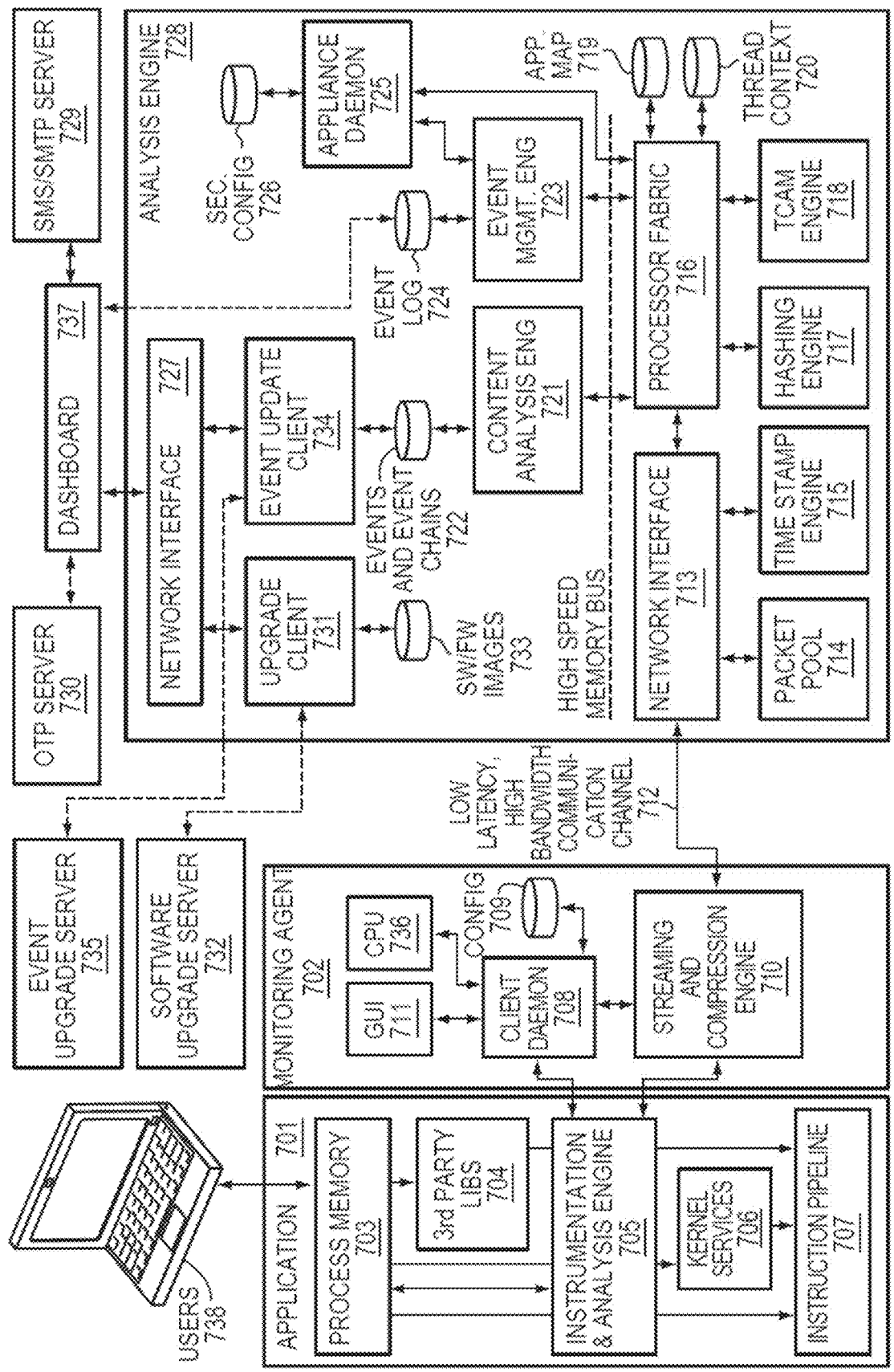
FIG. 7A illustrates an example block diagram of the client and analysis engine in embodiments of the present disclosure.

FIG. 7A depicts a high level block diagram of an example monitoring agent and analysis engine infrastructure. This infrastructure may be configured on a various hardware including computing devices ranging from smartphones, tablets, laptops, desktops to high end servers. As shown in this figure, data collection performed by the Monitoring Agent 702 may be segregated from analysis performed by the analysis Engine to improve application performance. The infrastructure provides high availability to prevent hackers from subverting its protection against malware attacks. The Monitoring Agent 702 interacts with an application to gather load time and runtime data. The infrastructure of the application 701 includes process memory 703, third-party libraries 704, kernel services 706, and an instruction pipeline 707. The infrastructure of the Monitoring Agent 702 includes the Instrumentation & Analysis Engine (instrumentation engine) 705, graphical user interface (GUI) 711, Client Daemon 708, Configuration database 709, and Streaming and Compression Engine 710, and central processing unit (CPU) 736. Local or remote users 738 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the Instrumentation and Analysis Engine (i.e., instrumentation engine) 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the instrumentation engine, Streaming Engine, GUI, Instrumentation & Analysis Engine 705 and itself. The Client Daemon also ensures that if any Monitoring Agent process, including itself, becomes unresponsive or dies, it will be regenerated. This ensures that the Monitoring Agent 702 is a high availability enterprise grade product.

The Instrumentation and Analysis Engine 705 pushes load and runtime data collected from the application into the Streaming Engine. The Streaming Engine packages the raw data from the Monitoring Agent 702 into the PDU. Then it pushes the PDU over a high bandwidth, low latency communication channel 712 to the Analysis Engine 728. If the Monitoring Agent 702 and the Analysis Engine 728 are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine 728 includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720, which may contain a table of the memory addresses used by a class of user executing an application monitored by the system. The infrastructure of the Analysis Engine 728 further includes the Content Analysis Engine 721, the Events and Event Chains 722, the Event Management Engine 723, the Event Log 724, the Application Daemon 725, the Analysis Engine Configuration database 726, the Network Interface 727, the Dashboard or CMS 737, the SMS/SMTP Server 729, the OTP Server 730, the Upgrade Client 731, the Software Upgrade Server 732, Software Images 733, the Event Update Client 734, and the Event Upgrade Server 735.

The PDU together with the protocol headers is intercepted at the Network Interface Card 713 from where the PDU is pulled and put into the Packet Pool 714. The timestamp fields in the PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 5. The efficiency of the Analysis Engine 728 can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine 728 performs searches, it may, from time to time find an invalid transition, invalid operation of critical/admin functions or system calls, or find a memory write on undesirable locations. In each of these cases, the Analysis Engine 728 dispatches an event of the programmed severity as described by the policy stored in the Event and Event Chain database 722 to the Event Management Engine 723. The raw event log is stored in the Event Log Database 724. The Dashboard/CMS 737 can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard/CMS 737 accordingly. The Dashboard/CMS 737 provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard/CMS 737 requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server 735 to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine 728. For this purpose, it must read configuration information from the Analysis Engine Configuration database 726. The daemon is also responsible for running a heartbeat poll for all processes in the Analysis Engine 728. This ensures that all the devices in the Analysis Engine ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine 728 or of the Monitoring Agent 702 for purposes such as fixing errors in the software. For this purpose, the Upgrade Client 731 constantly checks with the Software Upgrade Server 732 where the latest software is available. If the client finds that the entities in the Analysis Engine 728 or the Monitoring Agent 702 are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine 728 or the Monitoring Agent 702 does not match the image for the same component in the System image, then all images will be rolled to a previous known good system image.

PDU for Monitoring Agent and Analysis Engine Communication

Figure 7B:
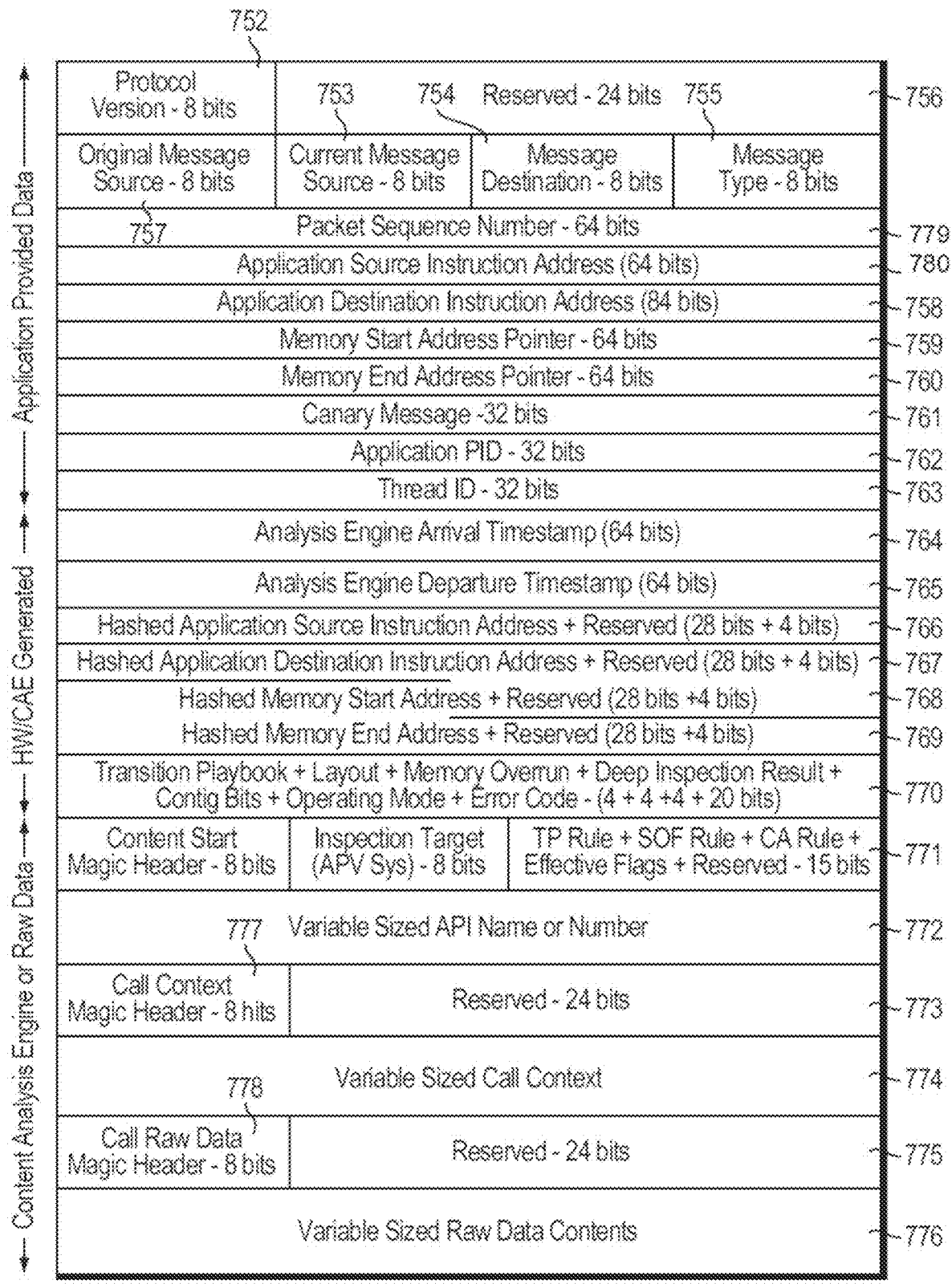
FIG. 7B illustrates an example protocol data unit (PDU) used to transmit data between the client and an analysis engine of FIG. 7A.

FIG. 7B illustrates an example protocol data unit (PDU) used to transmit data between the Monitoring Agent 702 and an Analysis Engine 728 of FIG. 7A. In order for the Monitoring Agent 702 and the Analysis Engine 728 to work effectively with each other, they communicate with each other using the PDU. The PDU can specifically be used by the Monitoring Agent 702 to package the extracted model of the application and/or collected runtime data for transmission to the Analysis Engine 728. The PDU contains fields for each type of information to be transmitted between the Monitoring Agent 702 and the Analysis Engine 728. The PDU is divided into the Application Provided Data Section, the HW/CVE Generated, and Content Analysis Engine or Raw Data sections.

The Application Provided Data Section contains data from various registers as well as source and target addresses that are placed in the various fields of this section. The Protocol Version contains the version number of the PDU 752. As the protocol version changes over time, the source and destination must be capable of continuing to communicate with each other. This 8 bit field describes the version number of the packet as generated by the source entity. A presently unused reserved field 756 follows the Protocol Version field.

The next field of the Application Provided Data Section is the Message Source/Destination Identifiers 757, 753, and 754 are used to exchange traffic within the Analysis Engine infrastructure as shown in FIG. 7. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Monitoring Agent side entity will also have a unique ID.

Monitoring Agent Side Entities
1. GUI
2. Instrumentation and Analysis Engine
3. Client Message Router
4. Streaming Engine
5. Client Side Daemon
6. CLI Engine
7. Client Watchdog
8. Client Compression Block
9. Client iWarp/RDMA/ROCE Ethernet Driver (100 Mb/1 Gb/10 Gb)

Per PCI Card Entities (Starting Address=20+n*20)
20. Analysis Engine TOE block
21. Analysis Engine PCI Bridge
22. Decompression Block
23. Message Verification Block
24. Packet Hashing Block
25. Time-Stamping Block
26. Message Timeout Timer Block
27. Statistics Counter Block
28. Analysis Engine Query Router Engine
29. Analysis Engine Assist Analysis Engine Host Entities
200. Analysis Engine PCIe Driver
201. Host Routing Engine
202. Content Analysis Engine
203. Log Manager
204. Daemon
205. Web Engine
206. Watchdog
207. IPC Messaging Bus
208. Configuration Database
209. Log Database SIEM Connectors
220. SIEM Connector 1—Dashboard/CMS
221. SIEM Connector 2—HP ArcSight
222. SIEM Connector 3—IBM QRadar
223. SIEM Connector 4—Alien Vault USM Analysis Engine Infrastructure Entities
230. Dashboard/CMS
231. SMTP Server
232. LDAP Server
233. SMS Server
234. Entitlement Server
235. Database Backup Server
236. OTP Client
237. OTP Server
238. Checksum Server
239. Ticketing Server
240. Event Chain Upgrade Server
241. Software Update Server All User Applications
255. User Applications—Application PID is used to identify the application issuing a query Another field of the Application Provided Data section is the Message Type field which indicates the type of data being transmitted 755. At the highest level, there are three distinct types of messages that flow between the various local Monitoring Agent side entities, between the Analysis Engine appliance side entities and between Monitoring Agent side and appliance side entities. Furthermore, messages that need to travel over a network must conform to the OSI model and other protocols.

The following field of the Application Provided Data section is the Packet Sequence Number field containing the sequence identifier for the packet 779. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Canary Message field contains a canary used for encryption purposes 761. The Monitoring Agent 702 and the Analysis Engine 728 know how to compute the Canary from some common information but of a fresh nature such as the Application Launch time, PID, the license string, and an authorized user name.

The Application Provided Data section additionally contains generic fields that are used in all messages. The Application Source Instruction Address 780, Application Destination Instruction Address 758, Memory Start Address Pointer 759, Memory End Address Pointer 760, Application PID 762, Thread ID 763, Analysis Engine Arrival Timestamp 764, and Analysis Engine Departure Timestamp 765 fields which hold general application data.

The PDU also contains the HW/CAE Generated section. In order to facilitate analysis and to maintain a fixed time budget, the Analysis Engine hashes the source and destination address fields and updates the PDU prior to processing. The HW/CAE Generated section of the PDU is where the hashed data is placed for later use. This section includes the Hashed Application Source Instruction Address 766, Hash Application Destination Instruction Address 767, Hashed Memory Start Address 768, and Hashed Memory End Address 769 fields. The HW/CAE Generated section additionally contains other fields related to the Canary 771 including the Hardcoded Content Start Magic header, API Name Magic Header, Call Context Magic Header and Call Raw Data Magic Header are present in all PDU packets.

The HW/CAE Generated section also includes a field 770 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine 728 whether the packet should be returned in compression mode. The Demo Flag indicates that system is in demo mode because there is no valid license for the system. In this mode, logs and events will not be available in their entirety. The Co-located Flag indicates that the application is being run in the Analysis Engine 728 so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The PDU also contains the Content Analysis Engine or Raw Data. All variable data such as arguments and return value of the OS library calls and System Calls is placed in this section of the PDU. The data in this section contains the content of the data collected from the application and is primarily targeted at the Content Analysis Engine. This section contains the Variable Sized API Name or Number 772, the Call Content Magic Header 777, the Variable Sized Call Content 774, the Call Raw Data Magic Header 778, Variable Sized Raw Data Contents 776, and two reserved 773 and 775 fields. Furthermore, these fields can be overloaded for management messages.

Digital Processing Infrastructure

Figure 8:
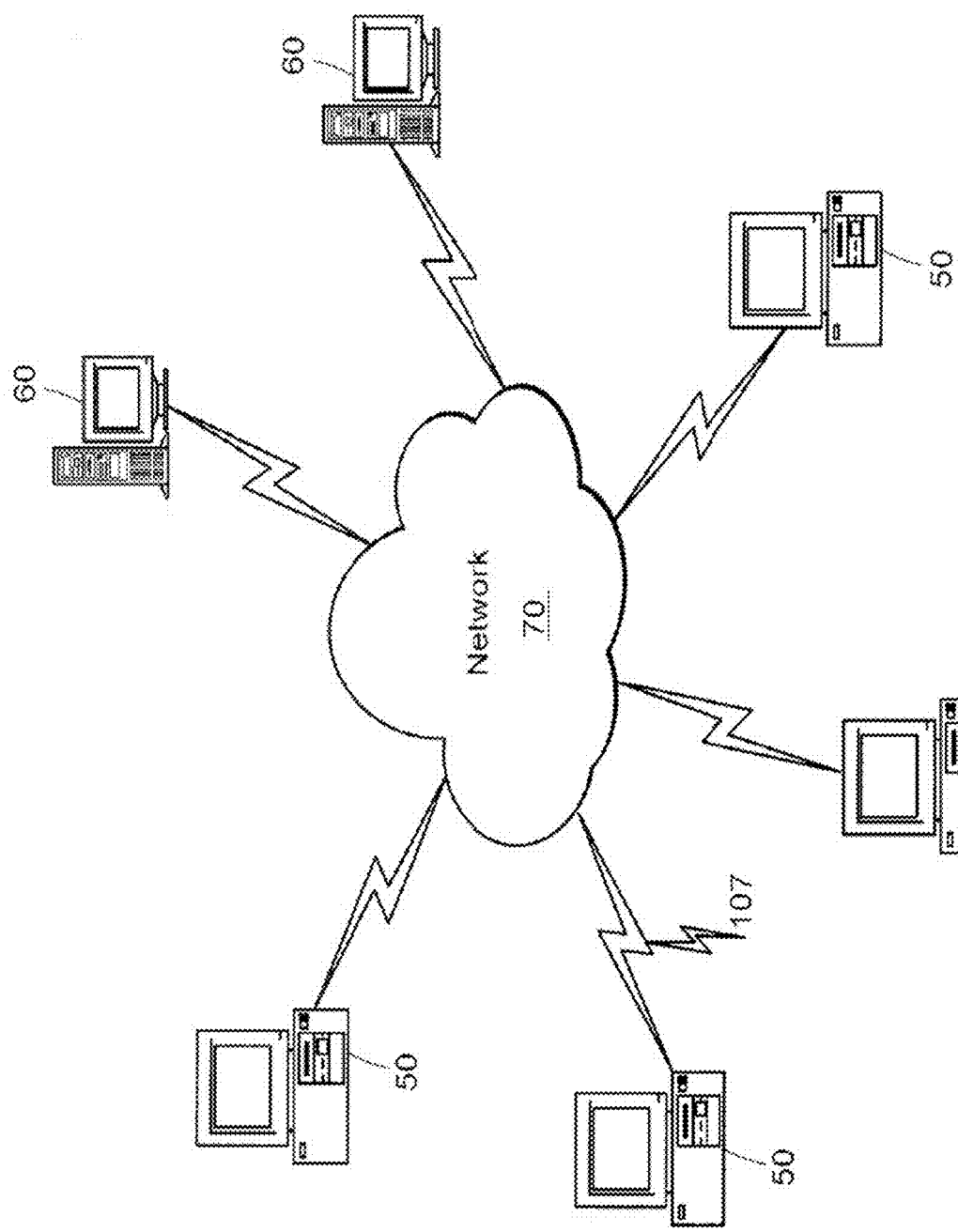
FIG. 8 illustrates a computer network or similar digital processing environment in which embodiments of the present disclosure may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured with the monitoring agent. Server computers 60 may be configured as the analysis engine which communicates with client devices (i.e., monitoring agent) 50 for detecting database injection attacks. The server computers 60 may not be separate server computers but part of cloud network 70. In some embodiments, the server computer (e.g., analysis engine) may analyze a set of computer routines and identify one or more computer routines of the set having a likelihood of vulnerability. The client (monitoring agent, and/or in some embodiments a validation engine) 50 may communicate a manipulation of the computer routines through a testing technique to the server (analysis engine) 60. In some embodiments, the client 50 may include client applications or components (e.g., instrumentation engine) executing on the client (i.e., monitoring agent, and/or in some embodiments a validation engine) 50 for initiating tests to asynchronously and dynamically manipulate the computer routines and determine unexpected behavior of the computer routines, and the client 50 may communicate this information to the server (e.g., analysis engine) 60.

Figure 9:
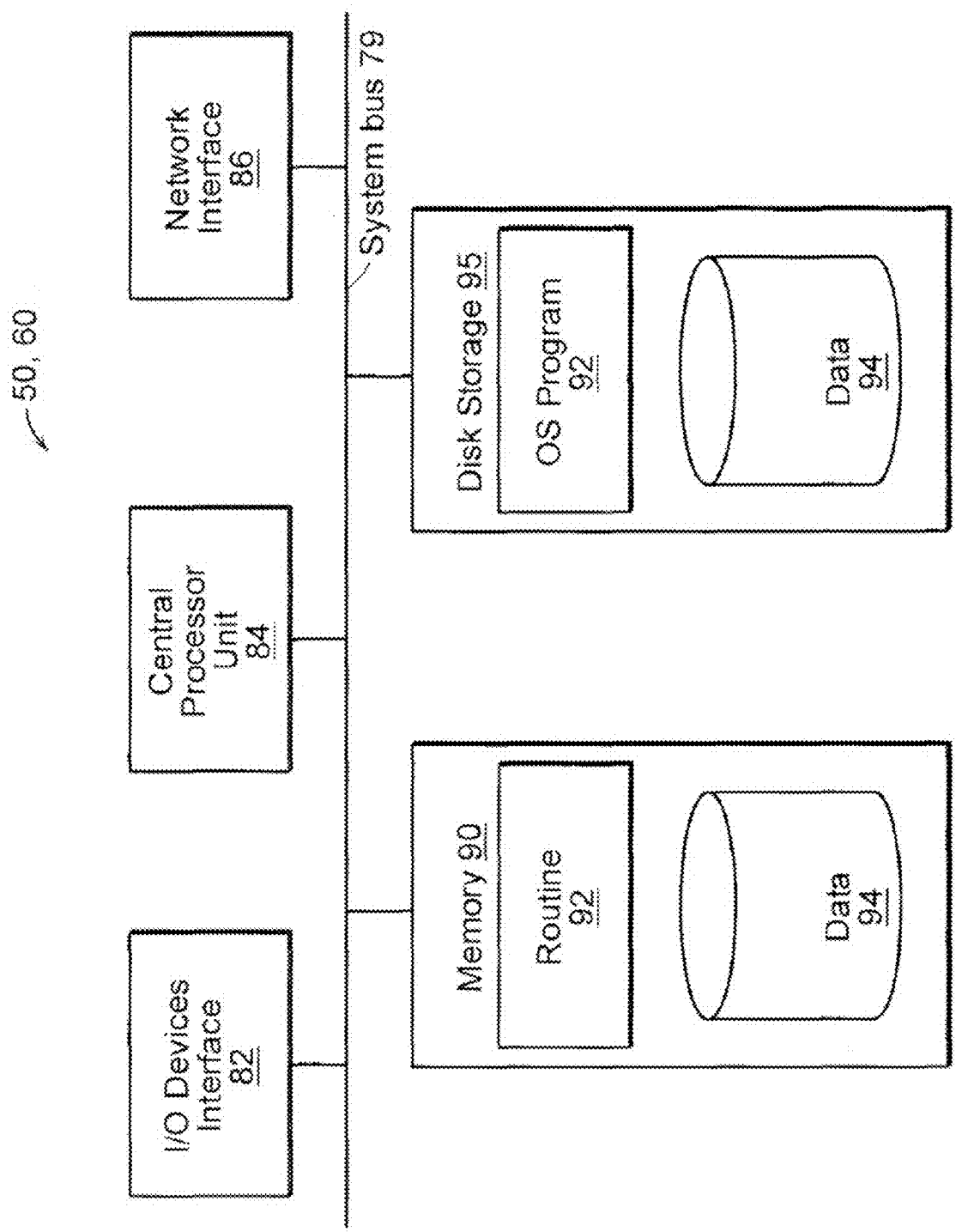
FIG. 9 illustrates a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., monitoring agent, instrumentation engine, and analysis engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Some embodiments may transform the behavior and/or data of a set of computer routines by asynchronously and dynamically manipulating at least one of the computer routines through at testing technique. The testing technique may include modification of a value, input parameter, return value, or code body associated with one or more of the computer routines, thereby transforming the behavior (and/or data) of the computer routine.

Some embodiments may provide functional improvements to the quality of computer applications, computer program functionality, and/or computer code by detecting improper handling of error conditions and/or vulnerabilities in the computer applications and/or computer code by way of the testing techniques. Some embodiments may check to see if the control flow of a thread changed as a result of manipulation (e.g., fuzzing), by comparing the control flow extracted with and without the given computer routine being attacked (through an attack vector). Some embodiments may deploy a code path to correct and/or replace the computer routine to avoid the unexpected and/or incorrect behavior.

As such, some embodiments may detect and correct computer code functionality, thereby providing a substantial functional improvement.

Some embodiments solve a technical problem (thereby providing a technical effect) of robustness of basic functionality of software and its error handling functionality. Some embodiments also solve a technical problem of exercising code paths that are too hard to reach in other test suites (thereby providing a technical effect). Some embodiments also provide a display to users in order to report status of testing, and thereby improve efficiency of testing, and thereby also solving a technical problem of lack of efficiency in test (and thereby also providing a technical effect).

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A computer-implemented method for determining unexpected behavior of a computer routine, the method comprising:
    analyzing a set of computer routines to identify a given computer routine of the set of computer routines having a vulnerability to unexpected behavior wherein, the identifying includes determining functions and system call sequences used by each thread associated with the set of computer routines to map run time control flow of the set of computer routines and the analysis includes at least one of: (i) performing a simulation to cause at least one failure condition and observing response of at least one computer routine of the set of computer routines to the simulation, (ii) extracting a histogram including a frequency of usage associated with the set of computer routines, (iii) determining size of one or more buffer read or write computer operations associated with the set of computer routines, (iv) determining size of one or more corresponding stacks associated with the set of computer routines, (v) determining size of one or more memory read or write operations based upon examining a corresponding loop size, and (vi) performing a taint analysis of one or more computer routine of the set;
    manipulating the given computer routine using a testing technique; and
    determining unexpected behavior of the given computer routine based on a result of the manipulating.

2. The method of claim 1 further comprising:
    deploying one or more patches to correct the unexpected behavior of the given computer routine.

3. The method of claim 1 further comprising:
    analyzing at least one corresponding sequence of computer routines of the set of computer routines.

4. The method of claim 1 wherein the given computer routine includes at least one of:
    a function; and
    a system call.

5. The method of claim 1 wherein manipulating the given computer routine further comprises at least one of:
    modifying data associated with the given computer routine, the data exceeding a corresponding buffer size; and
    modifying values that are declared in memory regions associated with the given computer routine.

6. The method of claim 1, wherein determining the unexpected behavior of the given computer routine includes:
    determining that a control flow of a given thread associated with the given computer routine has changed as a result of the manipulation;
    determining a failure condition that caused the thread to change its control flow; and
    displaying the failure condition.

7. The method of claim 1, wherein, for a function of the given computer routine, the testing technique provides at least one of invalid, unexpected, and random data to at least one of an input of the function, logic within the function, and an output of the function.

8. The method of claim 1, wherein, for a system call of the given computer routine, the testing technique provides at least one of invalid, unexpected, and random data to a system call parameter associated with the system call.

9. The method of claim 8, wherein the system call parameter is associated with at least one of: thread synchronization, process synchronization, thread scheduling, process scheduling, memory, memory allocation, memory deallocation, memory writing, memory reading, a network socket, creation of a network socket, network socket input, network socket output, pipe creation, system input, system output, shared memory fifo creation, a terminal input, a terminal output, file handling, file creation, file writing, file reading, disk input, and disk output.

10. A system for determining unexpected behavior of a computer routine, the system comprising:
    a processor; and
    a memory with computer code instructions stored thereon, the processor and the memory, with the computer code instructions, being configured to cause the system to:
    analyze a set of computer routines to identify a given computer routine of the set of computer routines having a vulnerability to unexpected behavior wherein, the identifying includes determining functions and system call sequences used by each thread associated with the set of computer routines to map run time control flow of the set of computer routines and the analysis includes at least one of: (i) performing a simulation to cause at least one failure condition and observing response of at least one computer routine of the set of computer routines to the simulation, (ii) extracting a histogram including a frequency of usage associated with the set of computer routines, (iii) determining size of one or more buffer read or write computer operations associated with the set of computer routines, (iv) determining size of one or more corresponding stacks associated with the set of computer routines, (v) determining size of one or more memory read or write operations based upon examining a corresponding loop size, and (vi) performing a taint analysis of one or more computer routine of the set;

manipulate the given computer routine using a testing technique; and determine unexpected behavior of the given computer routine based on a result of the manipulating.

11. The system of claim 10 wherein the processor and the memory, with the computer code instructions, are further configured to cause the system to: deploy one or more patches to correct the unexpected behavior of the given computer routine.

12. The system of claim 10 wherein the processor and the memory, with the computer code instructions, are further configured to cause the system to: analyze at least one corresponding sequence of computer routines of the set of computer routines.

13. The system of claim 10 wherein the given computer routine includes at least one of:
a function; and
a system call.

14. The system of claim 10 where, in manipulating the given computer routine, the processor and the memory, with the computer code instructions, are further configured to cause the system to:
modify data associated with the given computer routine, the data exceeding a corresponding buffer size; and
modify values that are declared in memory regions associated with the given computer routine.

15. The system of claim 10 where, in determining the unexpected behavior of the given computer routine, the processor and the memory, with the computer code instructions, are further configured to cause the system to:
determine that a control flow of a given thread associated with the given computer routine has changed as a result of the manipulation;
determine a failure condition that caused the thread to change its control flow; and
display the failure condition.

16. The system of claim 10, wherein, for a function of the given computer routine, the testing technique provides at least one of invalid, unexpected, and random data to at least one of an input of the function, logic within the function, and an output of the function.

17. The system of claim 10, wherein, for a system call of the given computer routine, the testing technique provides at least one of invalid, unexpected, and random data to a system call parameter associated with the system call.

18. A non-transitory computer program product for determining unexpected behavior of a computer routine, the computer program product comprising a computer-readable medium with computer code instructions stored thereon, the computer code instructions being configured, when executed by a processor, to cause an apparatus associated with the processor to:
analyze a set of computer routines to identify a given computer routine of the set of computer routines having a vulnerability to unexpected behavior wherein, the identifying includes determining functions and system call sequences used by each thread associated with the set of computer routines to map run time control flow of the set of computer routines and the analysis includes at least one of: (i) performing a simulation to cause at least one failure condition and observing response of at least one computer routine of the set of computer routines to the simulation, (ii) extracting a histogram including a frequency of usage associated with the set of computer routines, (iii) determining size of one or more buffer read or write computer operations associated with the set of computer routines, (iv) determining size of one or more corresponding stacks associated with the set of computer routines, (v) determining size of one or more memory read or write operations based upon examining a corresponding loop size, and (vi) performing a taint analysis of one or more computer routine of the set;
manipulate the given computer routine using a testing technique; and
determine unexpected behavior of the given computer routine based on a result of the manipulating.

* * * * *